Oct. 16, 1962

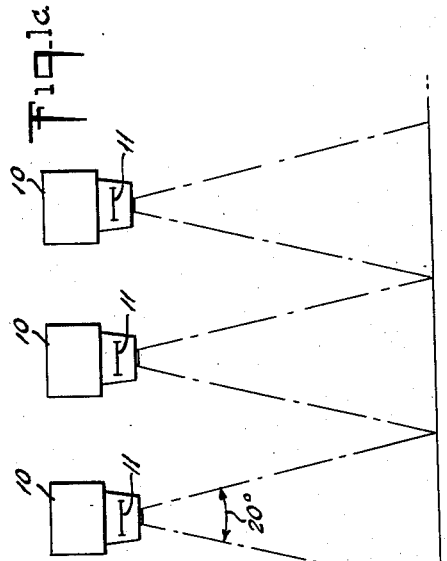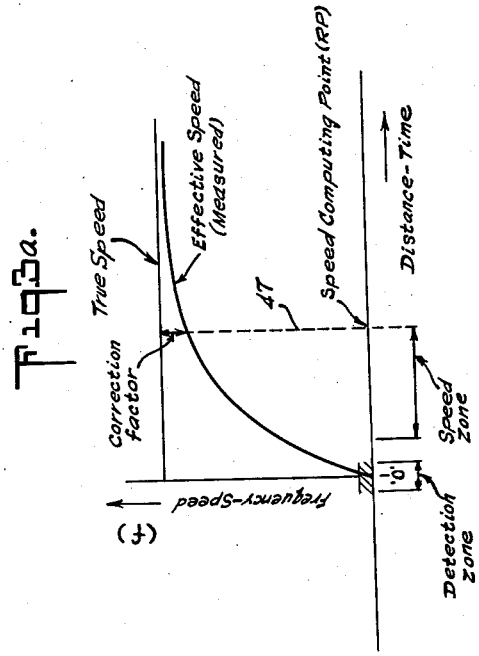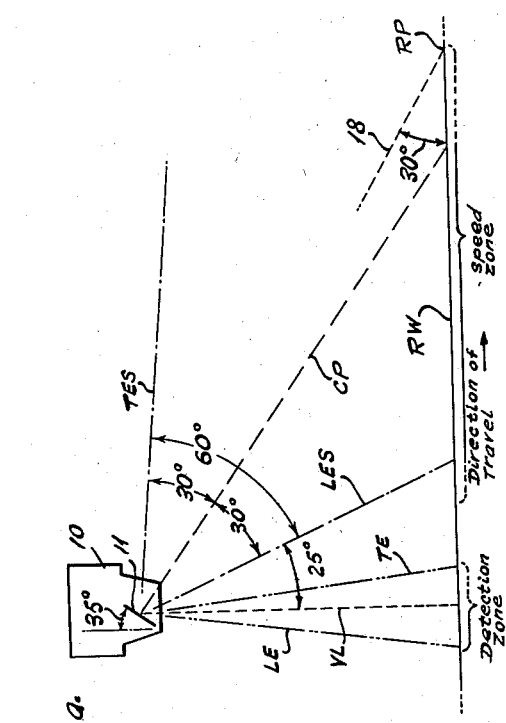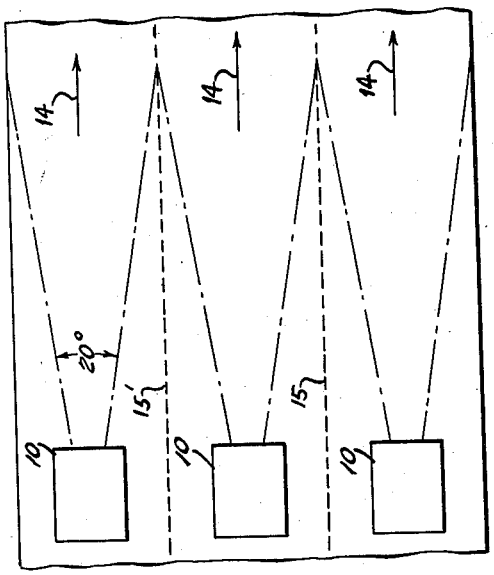

J. L. BARKER 3,059,232

TRAFFIC MONITORING SYSTEM

Filed May 1, 1958

INVENTOR
JOHN L. BARKER
BY
Edward H. Barnes
ATTORNEY

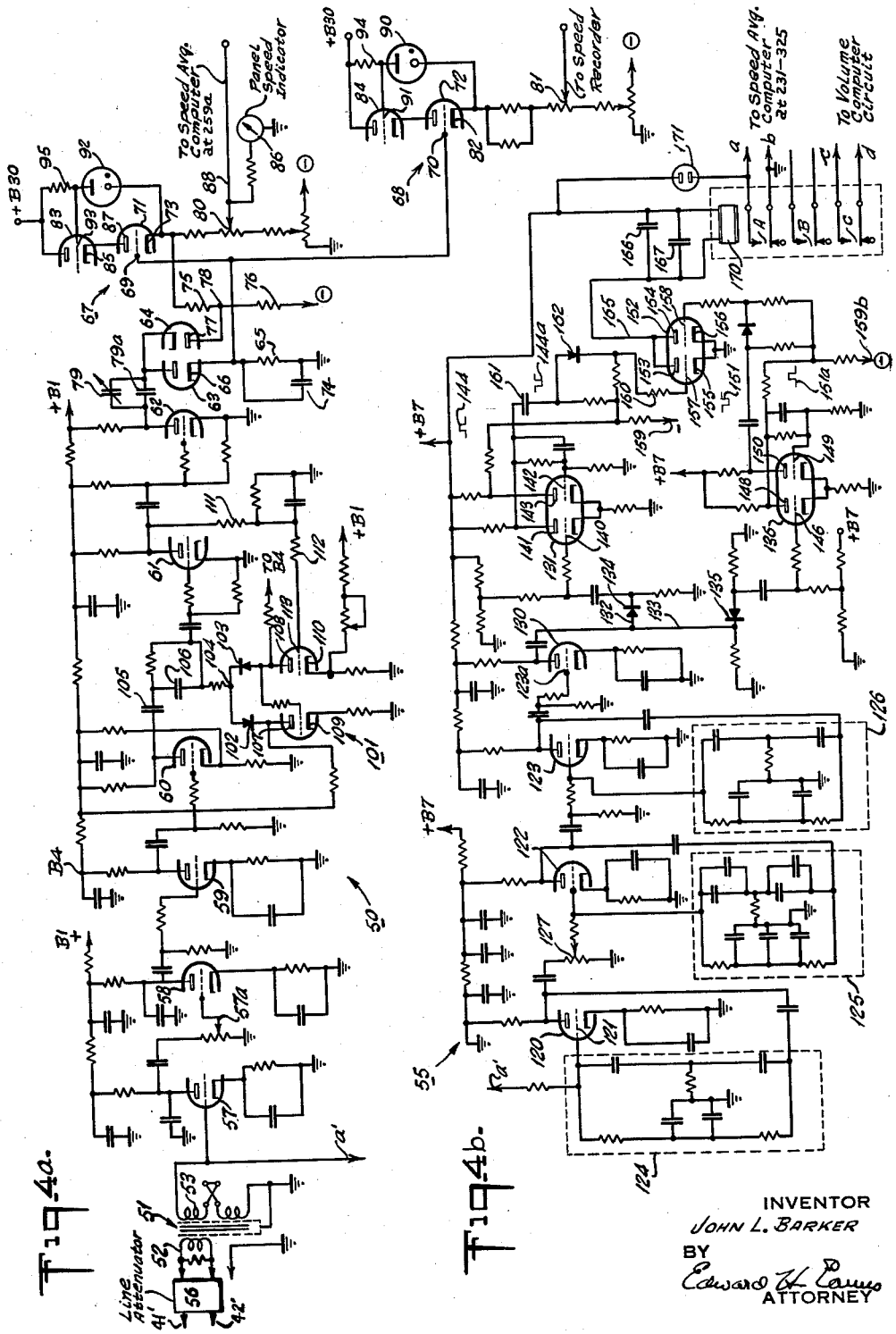

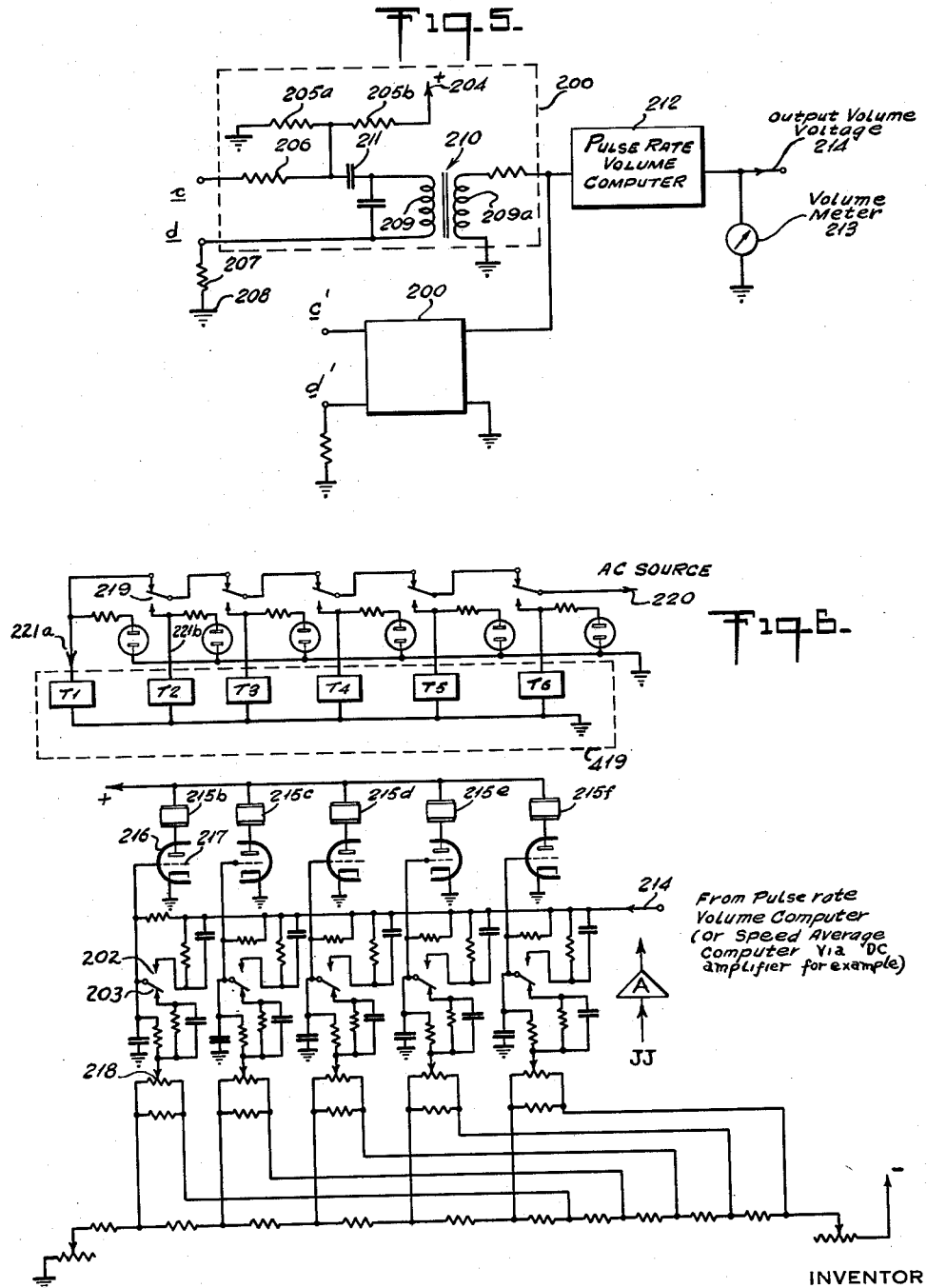

Oct. 16, 1962  J. L. BARKER  3,059,232
TRAFFIC MONITORING SYSTEM
Filed May 1, 1958  7 Sheets-Sheet 5

INVENTOR
JOHN L. BARKER
BY
Edward H. Earns
ATTORNEY

Oct. 16, 1962  J. L. BARKER  3,059,232

TRAFFIC MONITORING SYSTEM

Filed May 1, 1958  7 Sheets-Sheet 6

INVENTOR
JOHN L. BARKER
BY
Edward W. Evans
ATTORNEY

INVENTOR
JOHN L. BARKER
BY
Edward H. Loums
ATTORNEY

United States Patent Office 3,059,232
Patented Oct. 16, 1962

3,059,232
TRAFFIC MONITORING SYSTEM
John L. Barker, Norwalk, Conn., assignor, by mesne assignments, to Laboratory for Electronics, Inc., Boston, Mass., a corporation of Delaware
Filed May 1, 1958, Ser. No. 732,248
46 Claims. (Cl. 343—8)

This invention relates in its general aspects to a traffic monitoring system for sensing the presence and speed of vehicles passing a particular location in road traffic and for deriving traffic speed or traffic volume and speed information therefrom.

From certain aspects the invention relates to an improved system for monitoring individually and simultaneously traffic speed and volume at a particular location or at a plurality of spaced traffic sampling stations, correlating and integrating such sampled speed and volume information at a central indicating and recording location for the purpose of obtaining traffic engineering surveillance and operational information.

From another aspect the invention relates to an improved radar or microwave unit for the combined sensing of vehicle passage and speed in a desired traffic lane.

From a further aspect the invention relates to improved means or method for combined sensing of the speed and passage of vehicles in traffic and for transmitting the combined signal to a remote or central point where it is translated into separate speed and passage components for indicating, computing, storing or recording, such means or method being particularly adapted for obtaining such traffic information on a per lane basis on multi-lane dual highways or other high type traffic facilities, and at a single sampling point or at multiple spaced sampling points on the highway.

From certain further aspects the invention relates to an averaging computing system or method which derives a running average of the latest desired number of random values, and which is particularly adapted to deriving a running average of the speeds of the latest desired number of cars passing a road traffic sampling point. In a preferred form the averaging computer or method determines, stores and displays the latest individual value, such as the last car speed for example, as well as the latest average value including such individual value. A further feature of preferred form of the invention is that the root mean square (or R.M.S.) may be obtained as the average as desired.

In the preferred form illustrated herein the averaging computer is initiated through a cycle by passage of a car to read and store and display the speed of this last car, derives the square of the last car speed and automatically adjusts an average of the squares of a selected number of cars to take the last car speed into account, takes the square root of the newly adjusted average square and stores and displays the new (latest) R.M.S. value and prepares itself for similar cyclic response to the next car.

Major highways of the present day are subjected to an ever increasing volume and speed of motor vehicles so that more and more there is a tendency towards traffic congestion. To alleviate such congestion an ever increasing number of highway personnel is required so that the monetary cost of maintaining such highways free of congestion is an ever increasing one.

Modern highways, including the new dual or divided roadway with multiple lanes in each direction and limited access, such as expressways, parkways, turnpikes and the like, are costly to build and call of greater supervision and gathering and computing of traffic operations and planning information than can be adequately provided by the limited technical and accounting personnel available, so that there is a serious need for automatic means and methods of monitoring traffic and for computing and indicating traffic conditions and averages on a substantially continuous basis.

A major problem in the monitoring of traffic speeds in the past has been to assure that a desired speed indication or reading will be obtained for individual cars in a single lane without there being occasional readings from large vehicles in the next adjacent lane. Another problem in the past has been to obtain distinctive speed readings of successive relatively closely following vehicles in the same lane, since the frequency counting and speed indicating or reading circuits would hold on to the last car signal and switch over from one vehicle to another at variable points in the speed detection zone. If the speeds of the two successive vehicles are substantially the same as they often are in moderate to heavy traffic for rather closely spaced vehicles, the prior speed sensing equipment would sometimes not return to zero between vehicles, but would show only a small or sometimes negligible change in a sustained speed indication or speed signal for example.

The present invention provides a means for sensing the speed clearly or distinctly on a per lane basis and also individually for successive vehicles, reading the speed in a predetermined time and equivalent distance relationship to the initial passage detection pulse as the vehicle passes substantially under the radar sensing unit and by determining that time and distance at a low level, i.e., short range from the unit to read the speed of the vehicle quickly at short range and then be prepared for the next reading, i.e. that of a closely following vehicle in the same lane. Similarly by using only a narrow low frequency band for detecting Doppler speed frequencies at a high angle only, i.e. nearly under the radar sensing unit, the individual closely spaced cars may be detected separately and thus counted to determine the traffic volume. The radar sensing unit of the present invention thus provides in itself a combined signal in the form of a burst of proportionately changing Doppler frequency, the first or low frequency portion of which can be isolated to detect presence of the moving vehicle on a sharply defined basis for traffic counting and the second or higher frequency portion of which can be isolated to measure speed. This latter is the preferred form and is measured at a time lag controlled from the first portion.

A number of different systems for monitoring traffic conditions to some degree along major highways have been devised. Some involve the use of mechanical counters actuated by the passage of vehicles over an extended cable strewn transversely across a highway. This requires periodic checks to determine the number of vehicles traversing the highway in a given period of time and is time consuming. Other systems involve the use of radar techniques for determining speed and presence. These systems have indicator units which separately measure or record traffic speed and volume instantaneously or measure the volume over a given period of time. These systems have required separate units for measuring speed and volume and generally have some unit whose operating range extends across or over more than one lane or over a long distance along a road, so that errors may result because of more than one vehicle being in the general vicinity of the field of operation of the said unit.

The invention as contemplated herein involves the use of individual radar sensing units centrally located over individual traffic lanes at any desired traffic sampling location on a highway, or sets of such units at several such sampling points spaced at desired intervals along a highway. A single such unit and its associated translating, indicating and computing apparatus may also be applied to a single lane whose speed it is desired to monitor for example.

The sensing unit individually senses vehicular traffic both as to speed and presence (of moving vehicles), producing indicative signals representative of both. The sensing unit provides an alternating current (A.C.) signal corresponding to the Doppler beat note when a vehicle passes under it. Detection of presence occurs when the vehicle enters into part of the radar beam almost directly under the sensing unit, and continues beyond the sensing unit for a short distance in the beam. The speed information is derived while the vehicle is still under the influence of the radar beam and as the vehicle recedes from the sensing unit.

The signals indicative of traffic speed and/or volume are transmitted via common carrier transmission facilities to a remote central indicating and recording station where the received signals are processed according to speed and volume, and permanently recorded.

A speed and impulse translator at the central station first receives the transmitted information in the form of a Doppler beat note, which is a continuously variable frequency signal, and converts one portion thereof into a speed sensing signal and another portion thereof to an impulse or presence (of moving car) signal. The speed sensing signal is transmitted to a speed meter which indicates the speed of a vehicle after it has passed under the radar sensing unit, i.e., its instantaneous departure speed. In operation this instantaneous meter needle indicator rests at zero and as a vehicle passes and continues beyond the radar sensing unit the needle will come up to the correct value of the vehicle's speed and remain in this position for a short period of time and then drop again to zero with the departure of the vehicle.

The translator produces an impulse signal for the passage of each vehicle under the radar sensing unit which is transmitted to a speed averaging computer. The speed averaging computer also receives from the translator the electrical signal corresponding to the vehicle speed. The combination of impulse and speed signals to the speed averaging computer causes a signal therefrom indicating the speed of the last car, or a last car speed indication. This value remains fixed on the meter until another vehicle causes a displacement of the meter speed.

The last car speed is processed in the speed average computer to provide the average speed of a number of vehicles. This average is computed on a root-mean-square, i.e. R.M.S. basis in the preferred form. The last car speed is squared and averaged with the prior (old) average of the previously squared readings and the square root of the new resulting average square taken. This new value is the reading on the R.M.S. average indicator of the instrument.

The impulse signal from the translator is also transmitted to a volume computer which counts the number of pulses and operates a meter which is adjustable to show the rate or number of vehicles passing by the sampling or sensing location over some predetermined period of time. The output signal level of the volume computer is indicative of the traffic volume and is transmitted through a six level analyzer to a volume classification recorder.

The classification recorder contains six channels which correspond to the six segments into which the volume scale of the volume computer can be divided by the analyzer. The volume indicating voltage levels signal from the computer divides into each channel, according to the volume of traffic, and excites an elapsed time meter disposed therein for showing the accumulated number of hours that the volume has been in range of each of the six segments. The sum of the number of hours on the six classification timers or elapsed time meter correspond to the total number of hours over which the study is taken.

The output of the speed averaging computer with conventional amplification or adjusting of voltage, may be transmitted to such analyzer in lieu of such volume output, to operate the 6 level classification recorder as a speed classification recorder if desired. Obviously both volume and speed classification can be provided by individual analyzers and recorders if desired.

It is, therefore, one object of this invention to provide an improved traffic monitoring system which derives information concerning volume and speed of vehicular traffic at some particular location along vehicular highways.

Another object of this invention is to provide a traffic monitoring system having one or more traffic sampling stations and each generally including singular radar units disposed over singular highway traffic lanes for developing electrical signals indicative of traffic speed and volume on a per lane basis.

A still further object of the invention is to provide an improved traffic monitoring system having a central indicating and recording station for servicing individually and in group the signal information received from one or more traffic sampling stations and graphically displaying the traffic information received on visual type recorders.

And still another object of this invention is to provide in a traffic monitoring central indicating and recording station an improved speed and impulse translator for receiving signal information from a traffic sampling station and evaluating the speed of a moving vehicle and generating impulse signals therefor.

Another object of this invention is to provide in a central indicating and recording station for monitoring traffic conditions at one or more sampling locations along a highway, a speed averaging computer for receiving speed signals and determining an average of speds for a given number of vehicles, thereby producing a running average which is modified by each succeeding vehicle.

A further object of the invention is to provide a speed averaging computer for deriving the root mean square of a series of speed signals for a given number of vehicles and providing a running average which is modified by each succeeding vehicle.

An additional object of the invention is to provide a method or means for computing the average speed of a desired number of vehicles.

A further object of the invention is to provide a method or means for determining, storing and displaying the latest received value of a continuing series of random values, such as the speed of the last or latest vehicle passing a traffic observing point for example, replacing the previously stored and displayed value as each additional or new value is received.

Another object of the invention is to provide a method or means for determining a running average of the latest predetermined number of a continuing series of random values as received, such average being modified by each additional or new value as received, such as determining the average of the speeds of the latest desired number of vehicles passing a traffic observing point for example.

An additional object of the invention is to provide a method or means for receiving a continuing series of random values, storing and displaying the last received such value, determining an average of the last predetermined plural number of such values as modified by each new last such value as received, and storing and displaying the last such running average until the receipt of the next such value.

Another object of the invention is to provide a method or means for measuring the speeds of vehicles passing a traffic observing point and determining, storing and displaying the speed of the last of such vehicles until replaced by the speed of the next such vehicle, and determining therefrom a running average of the last predetermined plural number of such vehicles as modified by the latest such vehicle, and storing and displaying such running average until replaced by the next such vehicle.

A further object of the invention is to provide an improved radar or microwave unit for combined sensing of presence and speed of passing vehicles.

Other objects, advantages and aspects of the invention as embodied herein will be apparent from a reading of the specification and drawings herein:

FIGS. 1a, 1b and 1c show pictorially the radar sensing unit positioned over a highway, FIGS. 1b and 1c in particular showing three such units individual to three adjacent traffic lanes.

FIGS. 3a and 3b show a time versus frequency characteristic of moving vehicles in the field of operation of the radar sensing unit and the general field pattern of the radar beam on the roadway respectively with the horizontal scale in FIG. 3a foreshortened for convenience of illustration.

FIGS. 4a and 4b show schematically a speed and impulse translator, according to the invention, for producing a voltage output indicative of speed and an impulse voltage indicative of presence of a moving vehicle along a highway.

FIG. 5 shows schematically and partly in block form a detector impulse input circuit and a pulse rate volume computer for the production of an input voltage indicative of the volume of traffic traversing a given lane in a given period of time.

FIG. 6 shows schematically a classification system for translating the traffic volume (or speed) into a group of 6 different levels or ranges and output circuits from the several ranges or levels for operating elapsed time indicators for showing the period of time the traffic remains in a given volume or speed.

FIGS. 7a, 7b, 7c and 7d together show in block form and schematically a speed averaging computer according to the invention to provide the average speed of the last predetermined number of cars and also the speed of the last car.

Figure 8:
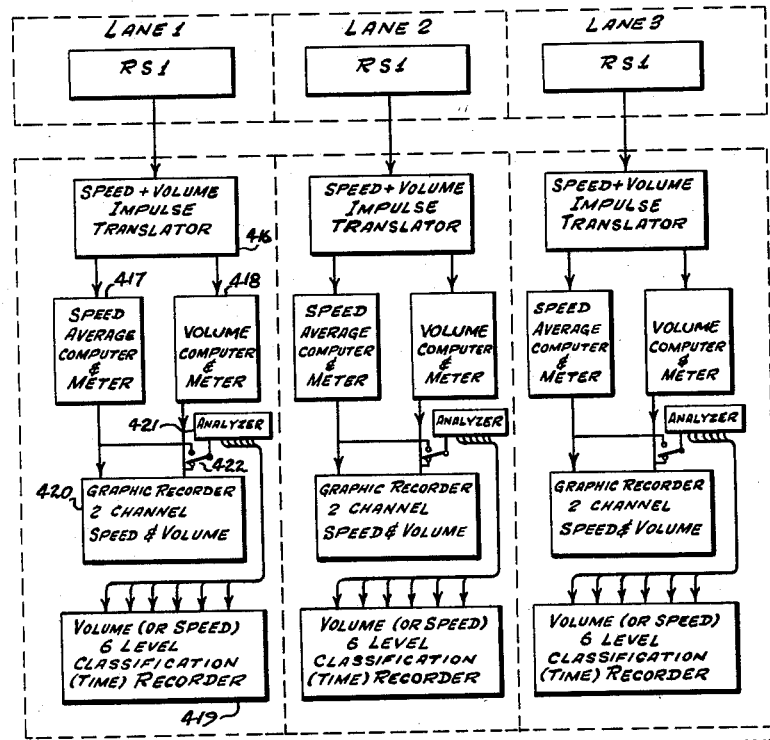

FIG. 8 shows in block form the overall traffic monitor system and the arrangements of the component parts comprising the system.

RADAR SENSING UNIT RS1

Now referring to the drawings and particularly to FIGS. 1a to 1c there are shown three radar sensing units 10 mounted over individual adjacent lanes for the same direction of traffic, indicated by arrow 14, on a multi-lane highway or roadway, and arranged so that passing vehicles in any one particular lane will come under the influence of the radar beam transmitted from the sensing unit mounted over that particular lane, the lines 15 and 15' in the horizontal view of FIG. 1b indicating the dividing lines between lanes.

In FIG. 1a (a vertical view), the sensing unit 10 is shown mounted over the roadway RW, with its antenna 11 mounted at an angle with the vertical of approximately 35° for example. The antenna 11 comprises an array of dipoles for example, individually horizontally mounted, to produce a horizontally polarized beam having a transverse beam width of approximately 20 degrees total between half-power points, as shown in horizontal projection in FIG. 1b and in vertical projection in FIG. 1c. The beam width between half power points along lines TES and LES in the vertical plane is approximately 60 degrees as shown in FIG. 1a, centered along line CP at an angle of 55° with the vertical VL. Four dipoles in a single horizontal row have been found effective in one embodiment for example.

The pattern at the surface of the road is elliptical as "illuminated" by the horizontal projection of the beam between its half power points, as shown in FIG. 3b, covering the width of a lane substantially as indicated by the lateral edges LL and LL' and extending in the line of travel of a vehicle from the antenna unit 11 to a distance of some 100 to 200 feet away for example. It will be understood that the energy level along the road within this beam pattern falls off progressively with distance from the antenna, toward the right in FIG. 3b, particularly beyond the center line CP.

The radar units are so arranged and the beam pattern so shaped that substantially only one traffic lane is covered and so that cars in only one lane are detected substantially directly under the unit 10, thus obviating the error of passing vehicles in another lane which may come under the influence of the beam in the lane under observation.

This is basically accomplished as to speed reading in the speed averaging computer through the restriction of speed information to an associated vehicle impulse in a lane. The position at which the radar sensing unit 10 detects the passage of a vehicle is from the point when the vehicle is essentially directly under the unit, i.e. from a few degrees ahead of to a few degrees past the vertical as the vehicle passes under the unit, as indicated by the lines LE and TE in FIG. 1a.

The information for speed measurement is derived as the vehicle recedes from the sensing unit, generally designated as the speed zone. The speed reading is measured at a point corresponding to an angle of approximately 30 degrees between the line of travel of the vehicle and the line between the sensing unit and the vehicle. This speed requires a cosine correction to secure the true speed the multiplying factor being equal to $$\frac{1}{.87}$$

or 1.15 since the cosine of 30 degrees is 0.87 approximately. Generally this calculation is carried out in the speed averaging computer discussed later.

Figure 2:
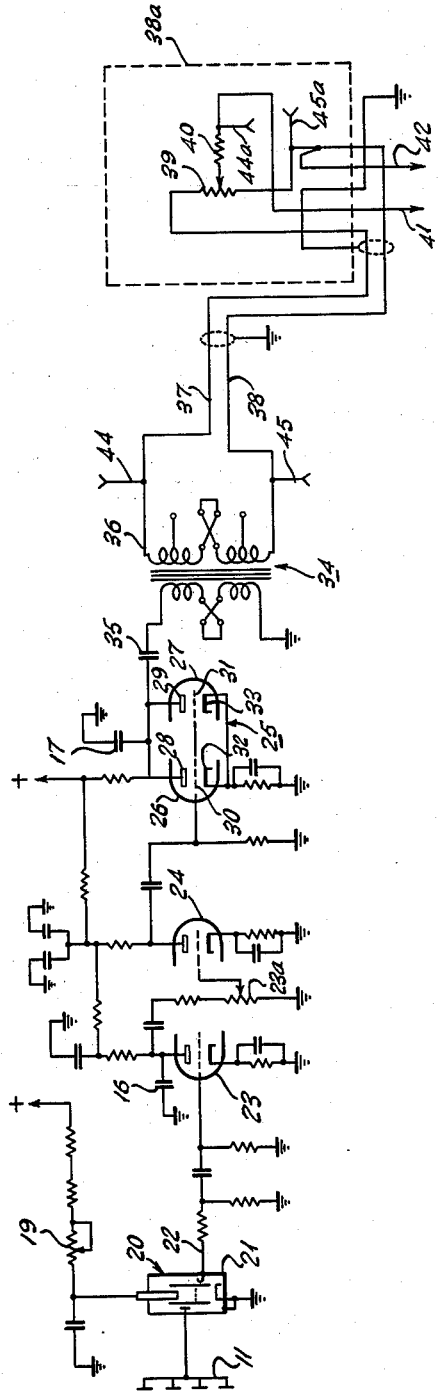
FIG. 2 shows schematically the radar sensing unit for developing a composite speed and volume signal indicative of vehicular speed and presence (in the sense of passage) according to the invention.
Figure 2B:
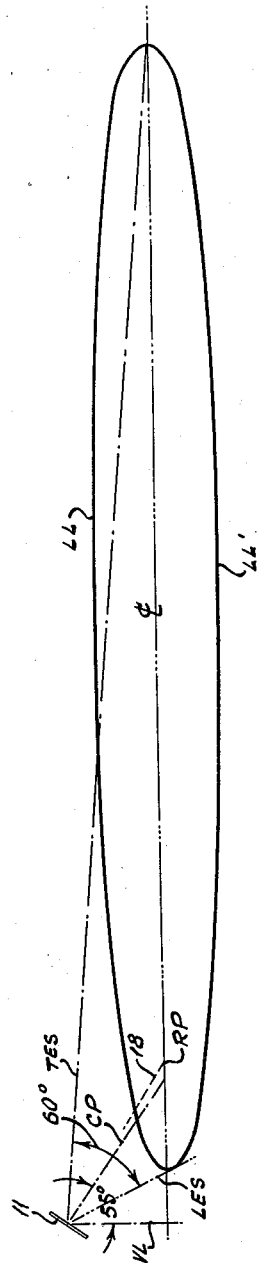

The radar sensing unit, as shown in FIG. 2 comprises in general an RF oscillator 20 of the resonant cavity type, a typical type tube being designated at 2C40 in the general category of lighthouse tubes, but not necessarily limited thereto. The RF power level is controlled by variable resistor 19 in the anode circuit. This oscillator produces microwave signals, of the order of 2455 megacycles for example, which are transmitted via a horizontally polarized antenna 11. The microwave energy from the oscillator is continually beamed and restricted to a confined path along the highway lane until a moving vehicle comes into the zone of operation of the radar beam. The intercepted beam is then reflected, so that a portion of the beam, at a higher frequency on approach and at a lower frequency on departure, because of the Doppler effect, is received. The Doppler shifted wave is reflected back to the antenna 11 and the oscillator 20.

The cavity 21 of oscillator 20 contains energy of the original transmitted frequencies plus a small portion of energy which is at a slightly different frequency due to the movement of the vehicle in the zone of operation. The combination of these two frequencies in the oscillator cavity 21 causes the resultant energy total in the cavity to exhibit small changes at the Doppler difference frequency. This energy or Doppler signal appears at the grid 22 of the oscillator 20 as a grid current change and is a low audio-frequency voltage at the Doppler-shift frequency. Grid circuit pickoff of the Doppler signal provides a high signal to noise ratio for the speed sensing function.

The Doppler signal is then amplified in two stages of resistance-capacity coupled amplifiers 23 and 24 having a band-pass frequency response of from 8 cycles to 1000 cycles for the assumed 2455 megacycles of radio frequency, for example. High frequency attenuation is provided by plate by-pass capacitors 16 and 17. Low frequency response is limited by the interstage RC coupling networks.

In intermediate amplifier stages 23 and 24, a variable gain potentiometer 23a is provided to set the amplitude level or sensitivity of the overall unit for calibration purposes.

The final or output amplification stage 25 comprises a pair of triodes 26 and 27 connected in parallel through their anodes 28, 29, grids 30, 31 and cathodes 32, 33 respectively. The output stage 25 drives a plate to line transformer 34 through capacitor 35. The transformer secondary 36 is a balanced type, providing isolation from ground which is desirable for transmission over telephone and communication circuits. The transformer secondary 36 is connected, via cables 37 and 38 to an output circuit having an impedance of from 300 to 500 ohms for example. The lines 37 and 38 are terminated by a sensitivity control circuit 38a, comprised of variable resistor 39 and fixed resistance 40 to provide approximately a two volt signal for example at the cable output terminals 41 and 42.

The main purpose of the adjustment in the sensitivity control assembly is to take care of short cable runs where losses are relatively low otherwise overloading of the speed and impulse translator might result. Also in connection with the sensitivity control 38a there are provided tests jacks 44a and 45a as a convenient means of checking the output voltages from the radar sensing unit for field testing. Test jacks 44 and 45 are also provided in the unit for test purposes.

After the Doppler frequency signal has been amplified, it is then transmitted either through generally normal telephone facilities or through generally normal radio communication facilities. In FIG. 3a there is shown graphically the Doppler frequency variation for a vehicle traveling in a direction receding from the radar sensing unit. This frequency variation is caused by the changing angle between the reflected energy and the true path of the vehicle. Thus the frequency (f) increases progressively, but at a decreasing rate of change, approaching the frequency representing the true speed, as the distance or time from "O" increases for any given vehicle in the radar beam while receding from the radar sensing unit at "O." Essentially then the signal derived is a variable frequency, one whose frequency rises and whose amplitude falls somewhat as the vehicle recedes from the sensing unit particularly in the main part of the radar beam.

FIG. 3a shows the approximate detection and speed zones and their relation to the order of magnitude of the Doppler frequencies while the vehicle remains under the influence of the radar beam in the particular zones. The frequency in the detection zone is relatively low and constant while the frequency in the speed zone varies as the cosine of the angle between the line of travel of the vehicle and the shortest radial line from vehicle to antenna 11, so that a multiplying factor must be applied to the value of the speed taken from the cosine of such angle to give the true value of speed. Actually from a study of the curve in FIG. 3a, and the field pattern shown in FIG. 3b, the cosine correction is generally taken as indicated at the broken vertical line 47 in FIG. 3a, at a cosine value of 0.87 as previously pointed out. This speed reading point RP corresponds with an angle of 30° with the horizontal at point RP in FIG. 1a where the line 18 at 60° from the vertical intersects the horizontal at the roadway or at the vehicle. It will be appreciated that since the vehicle extends a few feet above the road and the speed reading point is timed from the detection zone as explained below, the "point" RP is only an approximation.

The detection zone, as illustrated in FIG. 1a and FIG. 3a, is largely diagrammatic for the purpose of clearness and is not intended to be in exact proportion. In any event it will be understood that the length of this detection zone varies with the speed of the vehicle, being larger for low speeds and shorter for high speeds, because of the low frequency band pass filters used in connection with detection of passage and their relation to the reduction of the Doppler beat frequency from the passing vehicle with the decreasing cosine of the angle between the incident rays of the beam on the vehicle and the horizontal motion of the vehicle.

Thus for a high speed such as 60 miles per hour for example the length of the detection zone may be only of the order of one to two feet whereas for a low speed such as 15 miles per hour for example the length of the detection zone may be about four times as great. This relation is not exactly linear, particularly as the significant cosine changes more slowly with smaller angles to the horizontal and thus with larger angles outward from the vertical under the antenna, but for small angles from the vertical as in the detection zone, in contrast with the speed sensing zone for example, the significant cosine factor change is more nearly linear.

It will also be observed that since the energy level is attenuated with increasing distance along the road from the antenna this factor compensates largely for the increase in energy outward from the vertical as the vehicle approaches the central part of the beam where the angular pattern itself approaches a maximum of energy, so that the overall result of the angular arrangement of the beam as illustrated provides a nearly uniform energy level from substantially under the radar sensing unit 10 out substantially to the center of the beam.

The ideal arrangement would be to detect only the front of a vehicle, or only the back of a vehicle, as the initial approximation of speed for timing to the desired distance to RP for the cut-off of speed sensing in preparation for transferring this information to the mechanical storage elements in the speed averaging computer, as more fully described later, so that only one significant pulse length would be obtained independent of the length of the vehicle.

Actually it is found that there is some variable beat frequency signal received from the same vehicle while passing directly under the antenna unit as well as a beat frequency signal from the front and later from the back of the vehicle in passage. In order to reduce variability of the output detection pulse and the multiple pulsing from front and back of the vehicle, the capacitor 167 is connected across the coil of the detection output relay 170 seen best in FIG. 4b to sustain its operation considerably over the period while the vehicle is passing directly under the antenna unit, thus generally providing one output pulse for detection. Additional capacitor 166 may also be connected or disconnected as desired to obtain the desired effect.

The purpose of initiating the speed computing by the detection of the vehicle is twofold; such initiation correlates the speed reading of the computer with the proper vehicle in the proper lane and avoids false speed readings from large reflecting vehicles in adjacent lanes and also permits the speed of the vehicle to be read from a sufficient angle to give a close correct value of speed as corrected from the cosine factor at a point where the latter is changing slowly but not so far along the road as to prevent individual readings of speed for ordinary closely spaced successive vehicles in the same lane, as might be the case if an attempt were made to read the speed some distance further along the road where the cosine error is negligible and the Doppler beat frequency is substantially a true speed value.

SPEED AND VOLUME IMPULSE TRANSLATOR

Now referring to FIGS. 4a and 4b there is shown schematic drawings of speed and impulse translator units generally designated by reference numerals 50 in FIG. 4a and 55 in FIG. 4b.

These units are provided with generally conventional filtered and well regulated positive plate supplies and negative bias supply. The plate supply voltages are derived from B+ terminals indicated as +B1, and +B7 at 150 volts for example and +B30 at 300 volts for example. Bias voltage is indicated by the minus sign and is at −150 volts for example.

The function of the speed and impulse translator is to separate the speed and passage or impulse information from the transmitted Doppler signal, and to provide electrical signal inputs to circuits generally designated as speed averaging and volume computers to be discussed later herein.

The Doppler signal is, as was explained previously, transmitted via available communication facilities, such as a telephone line from lines 41 and 42 of FIG. 2 to lines 41' and 42' of FIG. 4a to transformer 51 (in FIG. 4a) which has a balanced primary 52 and an unbalanced or line to ground secondary 53. A line attenuator 56 of conventional type is preferably inserted between the incoming communication line 41'/42' and primary 52 to obtain the desired signal amplitude at this input. The Doppler signal is divided between speed meter section 50 of FIG. 4a and detector impulse section 55 of FIG. 4b. The speed meter section comprises a band-pass amplifier which receives the Doppler signal from transformer 51 and passes only a band of frequencies of essentially 30 to 750 cycles with low sensitivity from 30 to 90 cycles and of a substantially constant higher sensitivity from 100 to 750 cycles.

This frequency range of 30 to 750 cycles corresponds to those frequencies produced as the vehicle recedes from the radar sensing unit from and beyond a point approaching an angle of twenty-five degrees (25°) the angle calculated from a vertical line from the sensing unit to the roadway and a line from the sensing unit to the moving vehicle as shown in FIG. 1a, and denoted as the speed zone. This range of frequencies results from both the varying cosin factor and the various speeds of various vehicles passing along the road.

The Doppler signal representing the vehicle speed information appearing at the secondary of transformer 51 is amplied by conventional resistance-capacity coupled amplifiers 57, 58, 59 and 60 and limited by limiters 61 and 62 to achieve a constant amplitude voltage. A variable gain control potentiometer 57a between amplifier stages 57 and 58 is supplied to set the gain of the speed meter 50 to assure that no large input signals drive it to saturation, which would produce erroneous speed readings in the output.

The limiting signal is then passed to a double diode of counter composed of diodes 63 and 64 which generally function to convert frequency into corresponding D.C. voltage with increasing frequency rendering or producing increased voltage.

In some respects the speed meter functions in a manner comparable to the speed meter described in United States Patent No. 2,629,865 issued on February 24, 1953 to the applicant herein. The diode 63 has a cathode 66 from which a load resistor 65 and parallel capacitor 74 are connected to ground, the voltage or signal corresponding to speed being taken from the cathode 66 which is the voltage developed across resistor 65.

The speed signal voltage is then applied from resistor 65 to a pair of output stages 67 and 68 via grids 69 and 70 of cathode followers 71 and 72 respectively. To provide a high output voltage which is linear with respect to speed, a feed back signal is taken from cathode 73 of cathode-follower 71 and applied via resistors 75 and 76 to the plate 77 of diode 64.

The voltage at the junction 78 of resistors 75 and 76 determines the restoration level for the counting capacitors 79 and 79a so that their charge for each excursion of the limiter plate voltage is the same at a low speed reading as it is at high speed readings. Generally the voltage is set by trimmer capacitor 79 to produce a signal voltage at the grids 69 and 70 of cathode followers 71 and 72 respectively of 18 volts, which is made preferably corresponding to a 100 mile per hour speed. The cathode-follower output stages 71 and 72 are identical with cathode follower 71 providing a signal output at the tap on potentiometer 80 for the instantaneous speed meter and speed averaging computer. Cathode follower 72 provides a signal at the tap on potentiometer 81 for a graphic speed recorder as may be used in a typical traffic surveillance system. Potentiometers 80 and 81 in the circuits of cathodes 73 and 82 respectively allow for adjustment of the output signal voltage therefrom for calibration purposes.

To assure that the cathode-follower output circuits will have high stability and linearity, the anodes thereof receive their supply from cathode-follower 83 and 84 respectively. In general as the voltages on grids 69 and 70 of followers 71 and 72 rise in a positive direction, the voltages on cathodes 73 and 82 thereof follow. However, in conventional cathode follower circuits increased voltages in a positive direction on the grids would cause the voltages between the cathodes and the anodes of the followers to decrease, since the cathode voltages are increasing. This would cause the cathode voltage to drop and a nonlinearity to appear thus producing a crowding of the high end of the meter scale.

In the present case, to prevent this objectionable condition the cathode 73 of follower 71 is connected, through constant voltage regulator tube 92 to grid 93 of the follower 83, so that as cathode 73 goes positive, the grid 93 follows it in a positive direction by essentially the same amount. The grid 93 going positive pulls the cathode 85 more positive, with the section 83 working also as a cathode follower. The cathode 85 is tied to anode 87 of follower 71 and thus increases the anode voltage, thereby preventing the tube loss previously described. The same stability and linearity control applies to cathode follower 72 where constant voltage regulator 90 is used to control grid 91 of follower 84. Resistors 94 and 95 provide the necessary current through the voltage regulator tubes to assure that the tubes continue to conduct with a constant voltage drop.

There is further associated with speed meter section 50 of the speed and impulse translator an expander circuit generally designated by reference numeral 101 which maintains the gain of the amplifier 60 at a low level for low signal amplitudes and at a high level for signals capable of producing a true speed reading on the speed meter instrument or recorder.

The expander circuit 101 comprises a pair of clamping diodes 102 and 103 connected in series relation with their junction connection 104 tied to the output of stage 60 via coupling capacitors 105 and 106 respectively. Each of the diodes 102 and 103 are connected to anodes 107 and 108 of amplifiers 109 and 110 respectively. The expander is set in operation by the reception of a signal from the output of limiter 61 via coupling resistors 111 and 112 to the grid 113 of stage 110. A positive going voltage at the grid 113 turns on the expander circuit by reversing the conduction and non-conduction conditions of tubes 109 and 110. Generally for no signals or low signals resulting from the non-passage of vehicles or spurious effects, the amplifier 60 is loaded down by the expander circuit tied thereto in the output circuit. This is a form of clamping action produced by the conducting diodes 102 and 103. However, as a vehicle comes into the zone of operation, a large amplitude signal is received at a relatively low frequency due to the cosine effect, and despite the clamping action, this strong signal drives the limiter to provide an output signal to turn on the expander and the clamping action of the expander is opened or removed.

Thus the loading effect in the output stage of amplifier 60 is removed. This removal of the loading effect on amplifier 60 causes a sharp rise in amplification so that a clean sharp transition to the effective speed signal results.

It is to be appreciated that this effective speed is lower than the true speed by the cosine of the angle of the path of the vehicle and the impinging rays in the radar beam at the time, but rapidly approaches the true speed as the vehicle recedes from the radar sensing unit and remains essentially at the true speed value sufficiently long to allow observation of the meter as it is fed by the speed signal. This condition is pictorially shown in FIG. 3a showing that the cosine curve approaches the true speed as the distance from the radar unit increases.

The input speed signal amplitude is reduced as the vehicle recedes in the zone of operations and the limiter output signal falls as the vehicle leaves the zone of operation, the indicator dropping rapidly to essentially zero as the clamping action of the expander 101 is restored in response to the reduced output signal of the limiter.

The output speed signals from the speed section FIG. 4a of the speed and impulse translator, indicative of the speed of a moving vehicle receding from the radar sensing unit at the sampling location, are transmitted to two different units in the central monitoring and recording equipment, one signal to a speed meter 86, which may be panel mounted nearby or remotely for example and which shows visually the instantaneous speed of the moving vehicle. This same signal also goes via line 88 to terminal 259a in FIG. 7d to operate the speed averaging computer and is generally calibrated to give 14 volts corresponding to a 100 mile per hour signal. This speed signal may also be fed to low or high speed limit indicators, not shown, as desired. The other speed signal from the tap on potentiometer 81 feeds to a graphic speed recorder not shown here, and may be calibrated at a different voltage level as required.

As previously stated the Doppler signal, transmitted from the radar sensing unit to the speed and impulse translator of FIGS. 4a–4b, divides between a speed meter section FIG. 4a and an impulse section FIG. 4b. The impulse section is provided in order to obtain from the Doppler signal, a signal pulse representative of the presence of the moving vehicle, and then using this signal pulse to feed a volume computer and a speed averaging computer for the passage of each vehicle under the radar sensing unit.

Referring further to FIGS. 1a and 3a there is shown and illustrated the zone of frequencies wherein detection of the presence of moving vehicles takes place. The Doppler frequencies in this detection zone run in the order of from approximately 12 to 17 cycles, these frequencies existing even for high speed vehicles since the cosine angle factor approaches zero when the vehicle is directly under the radar sensing unit. The narrow band of frequencies, 12 to 17 cycles, provides a sharp impulse from vehicles and therefore allows closely spaced vehicles to be separated and counted as individual vehicles.

Referring to the left side of FIGS. 4a and 4b the Doppler signal from the transformer secondary 53 of FIG. 4a is fed via interconnecting lines $a^1$ to a first stage amplifier 120 of FIG. 4b at the input grid 121 thereof. The Doppler signal fed to the speed meter section may be first attenuated by an attenuator 56 (not shown in detail) to assure that the proper amplitude of signal in the transmission lines is available to drive the speed meter and impulse sections.

The output signal from amplifier 120 is further amplified by another pair of amplifiers 122 and 123 cascade connected. Each of the amplifiers 120, 122, and 123 have feedback arrangements from plate to grid, the said feed-back circuits including resistance-capacity (RC) coupling type filter networks 124, 125 and 126. The filter circuits are designed to produce a band-pass frequency response of from 12 to 17 cycles, the filters being stagger-tuned to achieve this response characteristic. It may be appreciated that although RC filters are illustrated in the arrangement as shown, other types of filters and other circuit arrangements may be used in order to secure the same band-pass frequency characteristics.

A gain-control potentiometer 127 is provided between amplifier stages 120 and 122 to control the signal amplitude and the overall sensitivity of the detection system so as to respond substantially only to a vehicle passing almost directly under the radar sensing unit and to avoid responding to vehicles in adjacent traffic lanes. In other words, when the vehicle traverses the detection zone of the particular associated lane, an impulse will be formed just prior to the entrance of the vehicle into the speed zone.

The Doppler signal ranging from 12 to 17 cycles is transmitted from the output of amplifier 123 to the input grid 123a of amplifier 130, the output of which drives two squaring amplifiers 131 and 136. In each of these pairs of tube sections one tube section is normally biased to cutoff with the other section normally conducting heavily in absence of input signal. Upon input signal of proper polarity and sufficient amplitude the conducting conditions will be suddenly reversed and remain so as long as such required input signal continues, but upon cessation of such required input signal the conducting conditions will quickly restore to the original state. The output will be a square wave of substantially constant amplitude and of time duration corresponding to the time length of such required input signal, and a square wave output following the input Doppler frequency signal is provided.

The output Doppler signal from amplifier 130 is divided via paths 132 and 133. The Doppler signal via path 132 is blocked negatively by diode 134 so that only positive signals are transmitted to the input of squaring amplifier 131. The Doppler signal via path 133 is blocked positively by diode 135 so that only negative signals are transmitted to the input of squaring amplifier 136.

A positive signal to the grid 140 of squaring amplifier 131 triggers this triode portion, normally cut-off, to conduction causing the negative going anode 141 to drive the grid 142 negatively. This biases the second triole stage to clut-off thus causing a positive going voltage in the anode 143 which has a relatively positive square wave form 144.

In a similar manner the negative going Doppler signal via path 133 drives the grid 146 negatively and cuts off this normally conducting triode section of squaring amplifier 136 so that the anode portion 148 of this triode section goes positive thereby driving the grid 149, of the second triode section positively, and thus causing this second triode to conduct. The anode 150 is driven negatively as a result of conduction in this triode section so that the resulting voltage thereon has a relatively negative square wave form 151. When anode 148 goes positive as described above, a positive square wave signal 151a appears at the output from the anode circuit.

Both positive square wave signals 144 and 151a are fed to an output stage 152 which comprises a pair of triodes having anodes 153 and 154 commonly connected, and cathode 155 and 156 commonly connected, and a pair of grids 157 and 158 to which are fed the positive square signals 144 and 151a respectively. The grids 157 anl 158 are normally biased to cut-off by negative voltage sources 159 and 159b respectively, the output stage 152 being non-conductive as a result. The positive going square wave voltage 144 drives the grid 157 of the output stage 152 in a positive direction sufficient to overcome the cut-off bias produced by the biasing source. The grid series resistor 160 prevents the grid from drawing grid current or from being driven positive.

To provide a slight additional length or pulse width to the positive pulse 144 at the end of its excursion or duration, capacitor 161 and diode 162 are provided, tied to or coupled to the anode 141 of the first triode section of squaring amplifier 131. When the latter returns to its initial condition, the anode 141 will again be non-conducting and a positive going voltage at the end of pulse 144a will appear therefrom. This positive going voltage will be rectified through capacitor 161 and diode 162 to provide a slight additional positive voltage voltage to the grid 157 of output stage 152 so that it will continue to conduct past the conductive period of the initial voltage wave 144.

In a similar manner the grid 158 is driven positively to produce an output voltage or current in the anode circuit 165. For a single burst of Doppler frequencies, there will be produced at the output stage 152 via grids 157 and 158 a pair of positive going square wave signals generated by the respective halves of the positive and negative Doppler signal wave. These signals are added in the output circuit 165 of stage 152 to produce a direct current in the coil of relay 170.

The operation of the circuits which extend the conductive periods of square wave voltages 144 and 151a provides a continuation of the relay current as the Doppler signal cycle (one wave) passes essentially through zero. Capacitors 166 and 167 are provided for the purpose of smoothing out any current variations in the relay circuit and generally provide a slight delay in the release of the relay 170. This circuitry permits a high speed relay to be employed while preventing its release between half cycles of the low Doppler frequency or from 12 to 17 cycles, for example, as well as during very brief momentary interruption of Doppler signal as the vehicle is passing directly under the radar sensing unit where the cosine value is theoretically zero, but some variable signal is found to exist from parts of the passing vehicle.

The relay 170 responsive to the Doppler frequencies in the range from 12 to 17 cycles as above explained is provided with three pairs of normally open contacts A, B and C. The closing of contacts A completes the circuit to the speed averaging computer detector relay DR in FIG. 7d which is connected via terminals a and b, the line at terminal b being grounded. A neon indicator light 171 is connected to this circuit so that when the circuit is completed the neon light becomes energized for each pulse transmitted.

Relay contacts C are used to provide via terminals c and d a pulse input to a volume computer detector input circuit in FIG. 5 to be explained presently, and contacts B are used to operate any other utilization device having need for such impulses which are indicative of the presence of moving vehicles.

VOLUME COMPUTER

Referring to FIG. 5 there is shown therein a schematic diagram of a system for receiving impulses and converting a predetermined number of them into a voltage reading proportional to the pulse rate and displayable upon a visible meter or graphic recorder. The form of circuit shown is generally and preferably, but not limited thereto, of the type appearing in apparatus produced by the Automatic Signal Division of Eastern Industries, Inc. of Norwalk, Connecticut and called the Electronic Cycle Computer, Model MC–11 and published in their manual so entitled copyrighted 1955. The computer comprises in general a plurality of input detector circuits indicated in FIG. 5 by the numeral 200, individually adapted to function with the output circuit c—d of relay 170 of FIG. 4b. The operation of relay 170 closes contacts C to complete an external circuit of the type shown in FIG. 5 through leads c and d. Each of the input circuits c—d or c'—d' in effect corresponds to a particular traffic lane at some remote sampling station where vehicular traffic data is to be produced. For purposes of illustration, only one input circuit need be described. A D.C. pulse voltage is secured from a potential divider which comprises resistors 205a and 205b. The junction voltage between these resistors charges capacitor 211 through the resistor 207 and the primary winding 209 of transformer 210. In response to the activation of relay 170 of FIG. 4b, the shorting of the detector terminals c and d through contact C, capacitor 211 discharges through primary coil 209, shorted terminals c and d and resistor 206. This produces essentially a square wave at the transformer secondary 209a. This square wave signal is then transmitted to the volume computer 212 of the type previously mentioned.

The pulse rate computer is essentially a device for receiving pulses indicative of traffic volume and capable of converting such indicative pulses into a D.C. signal whose amplitude varies in accordance with the repetition rate of such pulses. The D.C. signal so produced is one capable of being metered by conventional voltmeter means 213, and so calibrated as to give the volume of traffic, either as a direct quantity over a given interval of time or as some percentage of a given traffic volume. Whatever system of cycle pulses is used, it is the function of the computer to convert the incoming volume pulses to an output voltage which varies as a direct function of the traffic volume. In other words, the voltage produced by the computer varies substantially linearly with respect to the traffic volume and corresponds to the traffic level as averaged over a selected time period.

The computer output volume voltage 214 as it leaves the computer 212 is transmitted to a voltage scale analyzer or classification system as shown in FIG. 6 which may serve for volume classification or speed classification. Essentially this system comprises a series of individually operable relay circuits each adapted to function at a particular level of computer voltage 214, so that there will be a range of voltages at which each relay is capable of operating, corresponding to the traffic volume (or speed) within that range.

There are shown in FIG. 6 a group of five relays 215b, 215c, 215d, 215e and 215f, each operable in the same manner, but at different levels of computer voltages. It can be appreciated that other numbers of relays can be used depending upon the number of individual ranges desired.

Relay 215b is energized by the conduction of tube 216 caused by the level of computer voltage introduced to the grid 217 of the said tube. The triggering voltage of the tube is determined by the bias on the grid 217 set by potentiometer 218. The energization of relay 215b causes relay contacts 219 to complete the circuit from A.C. source 220 to an output circuit, at 221b representing the second of 6 levels or ranges of input voltage, indicative of volume or speed as the case may be and calibrated accordingly. This output circuit 221b may be used to excite an elapsed time meter, T2, which will show the accumulated number of hours that the volume has been in the particular volume range for which the relay was set. Contacts 202—203 of relay 215b serve to provide a positive or a negative pulse from the associated connected capacitor to insure clean operation or release respectively in switching between levels.

In a similar manner each of the other relays are excitable to operate elapsed time meters T3 through T6 respectively of the 6 level classification recorder 419 to give the other volume ranges desired, it being noted that in the absence of energization of any of these five relays the output circuit 221a will be activated to operate time meter T1 corresponding to the lowest level of volume for example.

Referring now to FIGS. 7a–7d, the speed averaging computer receives the speed and impulse information from the speed and impulse translator and from this determines an average or root mean square (R.M.S.) speed for a given number of vehicles. This is then effectively a running average selected for a given number of vehicles which is modified continually by each succeeding car. The speed averaging unit is shown schematically and in block form in FIGS. 7a, 7b, 7c and 7d, and comprises primarily three basic units, namely a servo-motor assembly 334 in FIG. 7b, a servo-amplifier assembly 305 in FIG. 7c and a control relay assembly, FIG. 7d, which includes electrical storage features.

Figure 7A:
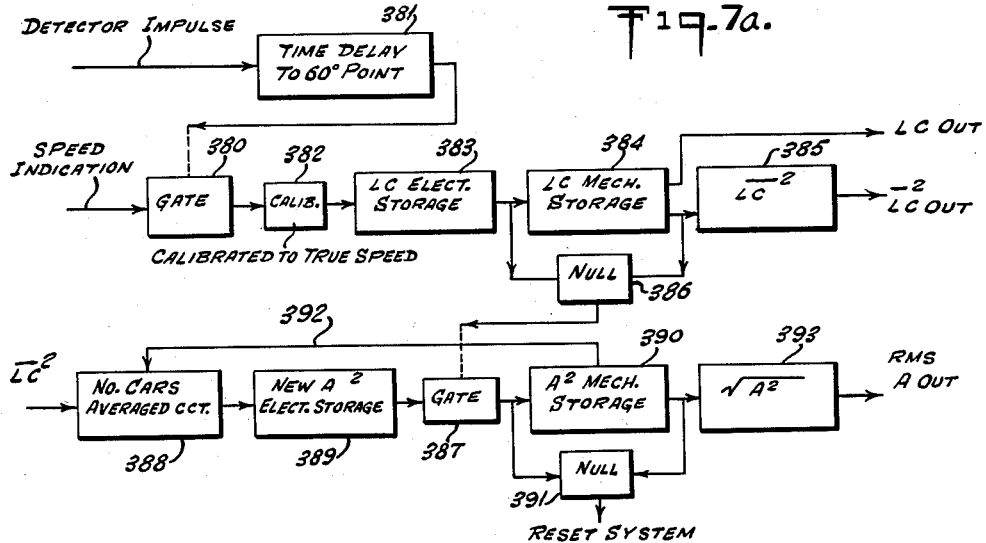
Figure 7B:
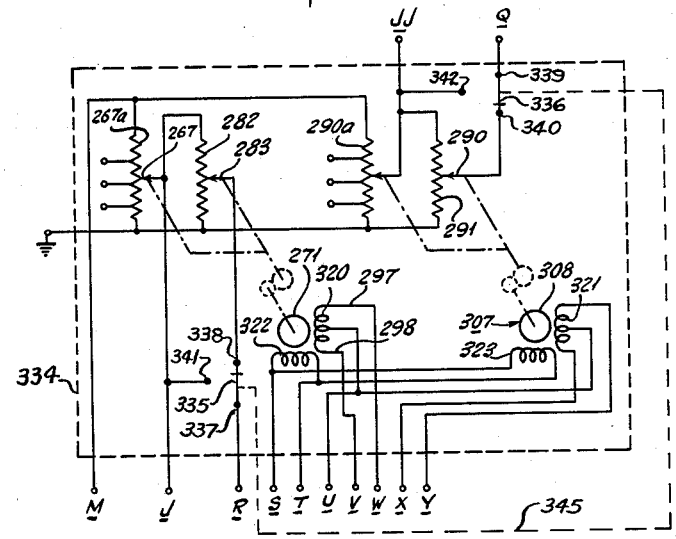
Figure 7C:
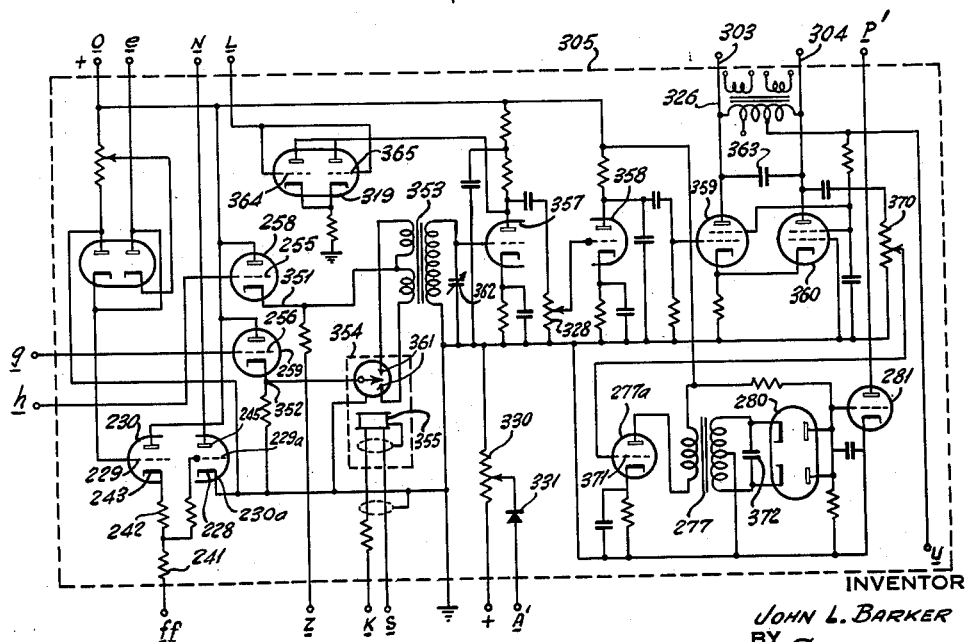
Figure 7D:
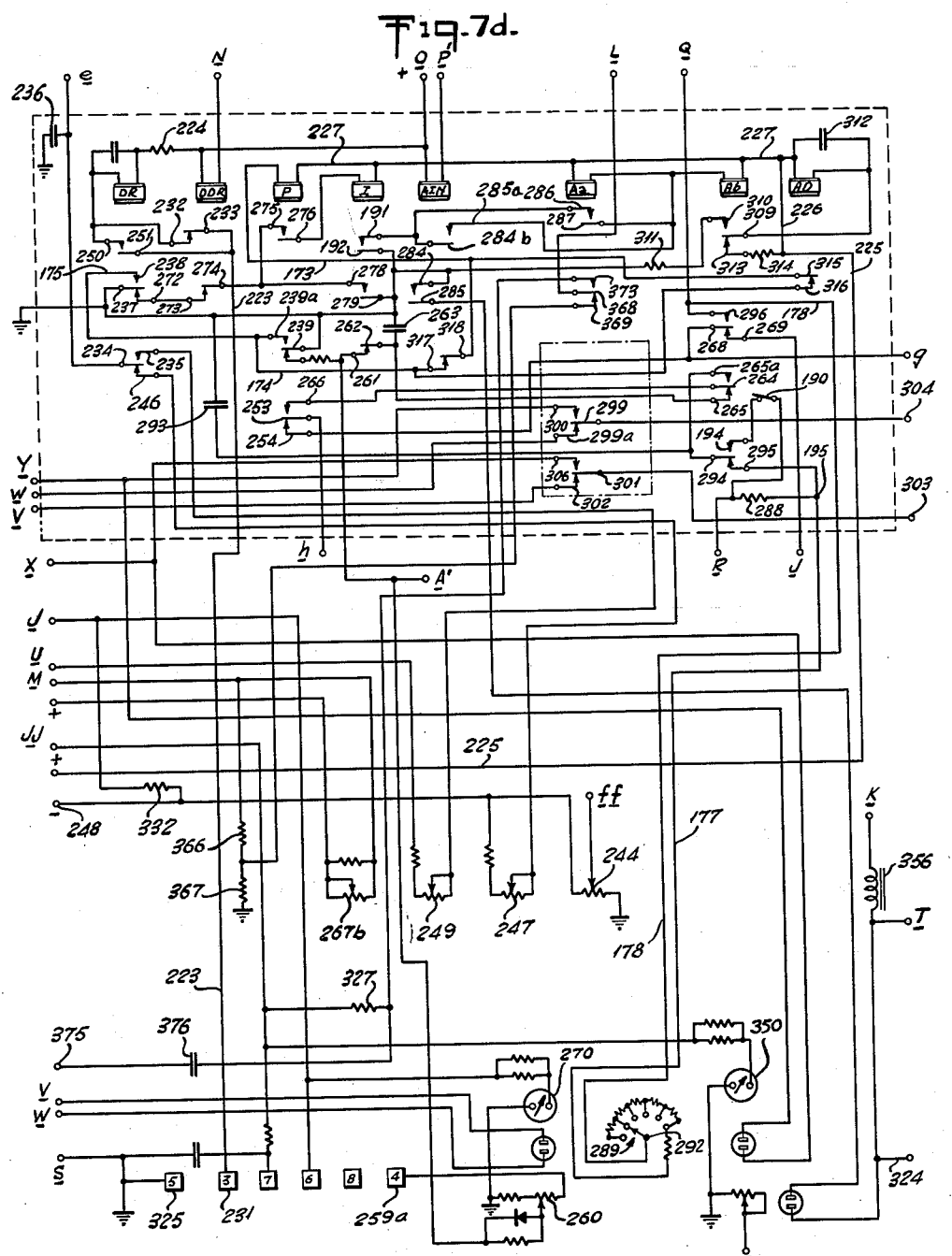

In general the relay assembly, FIG. 7d, receives the detector impulse information from the speed and impulse translator and starts the sequence of operation of the computer cycle. The servo-amplifier, FIG. 7c, receives the input signal relating to the last car speed from the relay assembly which also includes the last car information in the average reading. The amplifier converts the D.C. speed signals to the proper A.C. voltages for driving the servo-motor assemblies, FIG. 7b.

The servo-motor assembly, FIG. 7b, comprises generally two independent motor and potentiometer assemblies. The first assembly, including servo-motor 271 and potentiometer 267a is associated with the last car indicator and receives its information through the relay assembly, FIG. 7d, and servo-amplifier assembly, FIG. 7c, from the speed information transmitted by the speed and impulse translator. A second potentiometer section 282 on this motor in combination with the last car speed potentiometer 267a provides a squared voltage of the last car speed information. The second motor and potentiometer assembly including motor 308, potentiometers 291 and 290a, is associated with the average (R.M.S.) output circuit to be subsequently explained. The assembly is readjusted for each vehicle's speed so as to secure a running average. The average is actually taken by comparing the square of the last car speed with the square of the average speed before the computation is made and then adjusting the average to a new squared value. The primary average (R.M.S.) speed reading is on the second potentiometer 290a of this assembly, which also provides the average speed output voltage for operation of 350, the indicator meter on the panel and for remote recorders and indicators.

FIGS. 7b, 7c and 7d show more detailed information as to the structure and circuitry involved and its manner of operation. In FIG. 7d there is shown therein a series of relays and the sequence of operation shall be explained in connection therewith.

The computer cycle starts with the transmission of a detector impulse from the speed and impulse translator. This impulse signal is fed to input terminal 231 (at foot of FIG. 7d) and effectively grounds this terminal in the impulse circuit of the speed and impulse translator. Grounding of terminal 231 completes the circuit to detector relay DR, via wire 223, normally closed delay detector relay DDR contacts 232 and 233, the energizing circuit being completed through resistor 224 to the D.C. positive power supply through terminal O. The operation of relay DR closes its contacts 237 and 238 so that the circuit through relay P is completed from D.C. positive power applied through wires 225, 226 and 227, the coil of relay P, wire 173, normally closed contacts 317 and 318 of relay AIN, wires 174 and 175, contacts 237 and 238 of relay DR now closed, to ground. Relay P stays in, holding its contacts 239 and 239a closed for the complete computer cycle to bridge contact 237 and 238 of relay DR for the remainder of the computer cycle.

The operation of relay DR closes contacts 234 and 235 which completes a circuit through potentiometer 249 to charge up capacitor 236 in a positive direction which in turn via terminal and line e drives the grid 229 of the servo-amplifier stage 230 in FIG. 7c, in a positive direction. This positive voltage in turn is transferred to the grid 229a of servo-amplifier stage 230a via cathode resistor 242. Prior to energization of relay DR, which commenced the sequence of operations in the computer, resistor 241 in the circuit of cathode 243 of stage 230 provided negative bias via terminal and lineff, biasing potentiometer 244, in FIG. 7d to negative terminal 248 to cut off the amplifier stage 230a so that no current would flow in the anode 245 thereof. As capacitor 236 charges positively, stage 230a conducts so that the anode current thereof flows from positive power applied at terminal O through the coil of relay DDR in FIG. 7d, through the terminal N to the anode 245 in FIG. 7c to cathode 228 to ground. This energizing of relay DDR is completed almost as soon as relay DR pulls in. The charge on capacitor 236 is commensurate with the length of time the relay DR has remained energized.

The output circuit of the speed and impulse translator has an approximate inverse relationship with respect to speed and hence can be used as an approximate measure thereof. Therefore the voltage on capacitor 236 is large for slow speeds or slow moving cars and small for high speeds or fast moving cars. At the end of a vehicle impulse, relay DR falls out and its contacts 234 and 246 close to connect capacitor 236 to a negative voltage source 248 via DDR timing potentiometer 247 to discharge same or bleed off the positive charge stored thereon. The discharging of capacitor 236 causes the amplifier stage 230a to revert back to its original cut-off condition relay DDR falling out as a result. The time in which capacitor 236 is discharged is controlled by the timing potentiometer 247 and the voltage reached by capacitor 236 is controlled by the time of energization of DR relay. Hence the amount of time from the drop out of DR relay to the drop out of DDR relay can be adjusted and a circuit to release DDR, indicative of a given position of the vehicle after it has released the DR relay circuit, is provided. Thus the inverse relationship provides that the DDR relay will drop out when detected vehicles are a desired distance along the roadway from the radar antenna substantially independent of the speed of the vehicles.

The angle between the calculated location of the vehicle and the vertical directly under the radar sensing unit is of the order of some 60 degrees for example and provides a known relationship between the true speed of the vehicle and the speed as being measured at that point by the speed meter, a multiplying factor of approximately 1/0.867.

The detector input circuit at 231 is so arranged that when DR relay is energized it locks in over contacts 250 and 251 to the said input circuit. The pull in circuit through DDR relay contacts 232 and 233 is opened a short period after DR has pulled in. This type of circuit arrangement prevents DR relay from becoming energized again after one impulse prior to the time DDR relay has become de-energized, thus assuring that relay DDR completes its timed intervals to connect circuits which operate the last-car-speed potentiometer 267—267a these circuits being associated with the I-relay as will be explained subsequently. It would be possible for I relay to fail to be operated properly if DDR relay did not fall out during the time intervals intervening between the DR relay actuations if the above circuit were not provided.

THE LAST CAR MEASURING CIRCUIT

The operation of relay DR causes relay P to open its contacts 253 and 254 which contacts normally short circuit the grids 255 and 256 of cathode follower amplifiers 258 and 259 respectively.

At the time DR relay is operated, speed information of the order of 14 volts, corresponding to a speed of 100 miles per hour, is generated in the speed and impulse translator and fed via terminal input 259a and a "speed set potentiometer" 260 through relay I contacts 261 and 262 to charge capacitor 263 to ground. The voltage on capacitor 263 is connetced via contacts 264 and 265 of relay Ab prior to pull-in and contacts 253 and 266 of relay P when pulled-in, to the grid 255 of the cathode follower 258 which comprises one input to the servo-amplifier.

The other input, grid 256 of stage 259, to the servo-amplifier receives its feed from the last car potentiometer arm 267 through contacts 268 and 269 of relay Ab when not energized.

The voltage across potentiometer 267a in FIG. 7b is of the order of 10 volts and corresponds to one-hundred miles per hour. The speed indication of the last car is shown on the last car meter 270 which meter is connected from the last car potentiometer arm 267 to ground.

As previously stated, the operation of relay P removes the short between servo-amplifier input grids 255 and 256, so that grid 255 is connected to capacitor 263 and grid 256 is connected to potentiometer arm 267; the potential of the capacitor charged from the speed voltage input being an indication of vehicle speed at the moment, and the potential on the last car potentiometer arm 267 being an indication of the speed of the last car. The potential difference between the potentiometer arm 267 and capacitor 263 is a D.C. voltage which is converted to an A.C. voltage having the proper phase angle to drive last car speed servo-motor 271 in a direction to cause the arm 267 of potentiometer 267a to approach the voltage stored on capacitor 263 which is the speed at the moment.

When DDR relay falls out, which is an indication that it is time to take a reading a circuit is completed through de-energized DR relay contacts 237 and 272, deenergized DDR relay contacts 273 and 274 and energized P relay contacts 275 and 276, so that relay I will thereby become energized, and the circuit therethrough being completed to ground. Relay I remains locked-in through its own contacts 278 and 279 to ground. When I relay pulls-in its contacts 261 and 262 feeding capacitor 263 from speed voltage source 259a are opened so that the last car voltage remains on capacitor 263, no further voltage being applied from speed source 259a thereto.

As previously explained, servo-motor 271 is made operable in a direction such that the potential of the arm 267 of potentiometer 267a is the same or corresponds to the voltage stored on capacitor 263. To show or indicate when the potentiometer arm 267 has reached the same voltage corresponding to the voltage on capacitor 263, a null indicator circuit, to be described later, in the servo-amplifier assembly, is provided which substantially comprises transformer 277, amplifier 277a, rectifier 280 and an output stage 281, which together cause energization of relay AIN, such energization of relay AIN indicating a null or that the arm 267 of potentiometer 267a has reached the same voltage or potential as that of capacitor 263.

The last car speed is necessary to provide the average speed of a number of vehicles. The average is computed on a root-mean-square (R.M.S.) basis. That is, the last car speed is squared and this squared value averaged with the sum of the previously squared readings, and then the square root of the new squared average taken, to produce the average reading. This is accomplished by taking the voltage on the potentiometer arm 267, corresponding to the last car speed as stored on capacitor 263, and applying same to a second potentiometer 282 having an arm 283 mechanically tied to potentiometer arm 267 of potentiometer 267a via a common shaft. The voltage at potentiometer arm 283 is the square of the voltage on the potentiometer arm 267, and therefore the square of the last car speed measurement. The last car speed potentiometer 267a is connected across average car speed potentiometer 290a, the two potentiometer resistance elements 267a and 290a being connected in parallel.

Energization of null indicator relay AIN during the initial phase of the computer cycle, as previously explained, indicating that the speed information on capacitor 263 has been absorbed in the last car speed potentiometer 267a, completes a circuit through normally open AIN relay contacts 284b and 285a which are now closed, so that relays Aa and Ab are energized. Both relays Aa and Ab are locked in, over Aa contacts 286 and 287. The operation of both relays Aa and Ab connects circuits which change the square value of the voltage representing the average speed of the last number of cars by an amount depending upon the last car speed.

The potentiometer arm 283, the square of the last car speed measurement is connected via terminal R to resistor 288, through point 195, wire 177, number of cars averaging switch 289, wire 178, to terminal Q to the potentiometer arm 290 of average speed squared potentiometer 291. The setting of number of cars averaging switch 289 determines the resistance between arm 290 and capacitor 293 and consequently the ratio of this resistance to resistance 288, and this determines what fraction, such as 1/30 to 1/5, for example, of the difference in voltage between the last car speed squared potentiometer 282 and the average car speed squared potentiometer 291 will be applied at point 195 and added algebraically to capacitor 293, via normally closed contacts 294 and 295 of relay Ab. The resulting voltage on capacitor 293, which is desired on the average car speed squared potentiometer 291, will depend upon the setting of averaging switch arm 292 and the last car squared voltage and the previous average squared voltage.

Energization of relay Ab opens contacts 294 and 295 and disconnects the circuit which charged capacitor 293, namely the circuit comprising last car speed squared, and average car speed squared potentiometer arms 283 and 290, resistor 288 and switch 289, and connects capacitor 293, via now closed contacts 264 and 265a of relay Ab and 266 and 253 of relay P now closed to the input grid 255 of servo-amplifier 258. The other input to servo-amplifier input grid 256 will be connected from the average car speed squared potentiometer arm 290 via relay Ab normally open contacts 268 and 296, now closed.

During the adjustment of the last car potentiometer 267a, the servo-motor 271 had its operating field terminals 297 and 298 connected by contacts 299 and 299a and contacts 301 and 302 of relay Aa when deenergized, to the output terminals 304 and 303 of servo-amplifier assembly 305. Energization of relay Aa opens contacts 299 and 299a, and contacts 301 and 302, thereby disconnecting servo-motor 271, and via relay Aa contacts 299 and 300 and contacts 301 and 306 connects the output terminals 303 and 304, of servo-amplifier assembly FIG. 7c to the average car speed servo-motor assembly 307.

Hence the servo-motor 308 of average car speed servo-motor assembly 307 is caused to rotate, and through suitable gearing repositions potentiometer arm 290 to a new position, which position corresponds to the new average value as indicated by the voltage which had been stored on capacitor 293. A manual switch 190 is provided to connect capacitor 293 to potentiometer arm 283 through contacts 194 and 294 of relay Ab, for test purposes.

Energization of relay Ab causes energization of relay AD, with capacitor 312 in parallel, from positive power through wire 225, wire 226, the coil of relay AD, through contacts 309 and 310 of relay Ab, resistor 311 to ground. The combination of resistor 311 and capacitor 312 provides a time delay for such energization of relay AD after relay Ab has been energized. The relay Ab energizing circuit from the positive power supply through wires 225, 226 and 227, the coil of relay Ab follows through the relay Aa lock-in contacts 286 and 287, contacts 191, 192 of relay I to ground. After relay Ab has fallen out, capacitor 312 discharges through normally closed relay Ab contacts 309 and 313 and resistor 314, so that relay AD falls out in a much shorter time period than it took to become energized.

The operation in combination of relays AIN and AD indicate that the new value of the average potentiometer has been reached and that the computer cycle is completed. Also the relays are then reset to their normally de-energized position through the opening of relay AD contacts 315 and 316 and relay AIN contacts 317 and 318 which cause relay P to fall out, the relay P contacts 239 and 239a having been holding the other relays energized through their holding circuits, and thus the computer cycle is completed.

In operation there can be two sequences depending upon the amount of change in the average car speed potentiometer 290a. If the last car speed potentiometer 267a had a voltage considerably different than the voltage from potentiometer 290a, the time necessary to change the potentiometer 290a to its new position would be relatively long and the computer cycle would not be completed until the AIN null relay operated to indicate the balance and relay AD would have pulled in during this intervening time. However, in the majority of instances the change in the average car speed potentiometer 290a setting will be very small and therefore the AIN relay may or may not be de-energized. This change may be small due to the fact that only a small percentage of the last car speed potentiometer voltage is being applied to alter the potentiometer 290a or that there may not be much difference between the last car speed and average speed. Therefore under these conditions the small change in the potentiometer 290a towards its new correct value is insured by operation of the slow action on energization of relay AD after the average car speed servo-motor 308 has been connected. Both the last car speed potentiometer 267a and the average car speed potentiometer 290a have applied thereto at their live end a D.C. voltage feed adjustable to 10 volts via variable resistor 267b to correspond to the full scale deflection of the instrument.

Referring now to FIG. 7c, the servo-amplifier assembly and its manner of operation may be described as follows: a D.C. input signal is applied to the grids 255 and 256 of D.C. isolation stages 258 and 259 respectively which provide high impedance input so that voltages at the capacitors 263 and 293 may be measured. Stages 258 and 259 have cathode follower outputs 351 and 352 each of which feed transformer 353 and vibrator or chopper 354, respectively to provide an A.C. voltage equivalent to the input D.C. voltage. The vibrator 354 is provided with an excitation coil 355 having a choke 356, shown in FIG. 7d, in series therewith to provide the proper voltage and phase angle to drive the vibrator or chopper. The A.C. voltage at the output of transformer 353 is amplified by amplifiers 357 and 358 and then applied to output driver amplifier 359 and 360 acting in push-pull. The output amplifier provides the necessary output to drive servo-motors 271 and 308.

The phase angle of the A.C. voltage from the output amplifier 359 and 360, to the servo-motors is made adjustable by the phase angle of vibrator contacts 361, and by the tuning capacitor 362 across the secondary of transformer 353, and also by capacitor 363 across the output stage.

This phase angle is adjusted for a 90 degree phase difference between the driving fields 320 and 321 and the fixed fields 322 and 323. The fixed fields 322 and 323 are each excited from a 115 volt A.C. source via terminals T (324) and S (325). The amplitude of the signal output from output amplifier 359 and 360 is generally and approximately proportional to the D.C. input signal to stages 258 and 259. The phase angle of the A.C. signal output changes 180° with a reversal of relative magnitudes of the D.C. input signals at grids 255 and 256, thereby reversing the servo-motors to drive the potentiometer arms to new positions.

Across the output amplifiers 359 and 360 there is disposed a transformer 326 connected to the anodes of these amplifiers for the purpose of maintaining the D.C. voltage on the output stages, and thereby preventing high D.C. switching transient signals when the last car speed and average car speed servo motors 271 and 308 respectively are switched by relay Aa.

The null indicator circuit comprising stages 277a, 280 and 281 and transformer 277, has its own gain control adjustment provided via potentiometer 370 in the anode circuit of output stage 360. This gain control feeds the grid 371 of stage 277a which in turn drives transformer 277. The transformer 277 has connected across its secondary a capacitor 372 which tunes it to 60 cycles, thus eliminating all other signals other than 60 cycles which is the driving voltage in the output stage 360.

Across amplifier 357 there is disposed a variable resistance load in the form of a vacuum tube 319, such as a single or dual triode, for example, which serves to control the gain of amplifier 357. A pair of grids 364 and 365 of tube 319 are connected together and driven positively to cause the conduction thereof. The grids are fed from a voltage divider comprising resistors 366 and 367, via normally closed contacts 368 and 369 of relay Aa via terminal L. This voltage divider provides a slight positive bias for the grid. This circuit is complete via contacts 368 and 369 when the last car speed potentiometer 267a is being adjusted, and at all times except when the average car speed potentiometer 290a is being adjusted.

The servo-amplifier is purposely made more sensitive for average speed adjustment than for last car speed adjustment since the change in the former is relatively small for each sequence of events. This is made possible by the gain control tube 319 being switched from a fixed positive bias to the D.C. voltage corresponding to the average car speed voltage output when changing from last car speed matching adjustment to average speed matching adjustment. This gives an increase in gain of the servo-amplifier stage 357 at the lower speed values so that the responsive system remains essentially constant over the squared voltage range of the output. To switch grids 364 and 365 of stage 319 to the average car speed output, relay Aa is pulled in so that the circuit through normally open contacts 368 and 373, now closed, is completed via resistor 327. The sensitivity of the system is further increased by overcoming static friction by the insertion of an oscillation voltage of filtered 120 cycles from line 375 via capacitor 376 into the grids 364 and 365 of tube 319, which causes a very slight dither of the servo-motor.

Generally the gain potentiometer 328 interposed between amplifier stages 357 and 358 is preferably adjusted with the computer operating in the average car speed circuit. This can be accomplished by blocking relay AD from operating. The gain potentiometer can be so set that the average car speed servo motor system does not oscillate or hunt with respect to its null point. The null potentiometer 370 at the output of amplifier output stage 360 should be adjusted to as high a gain possible while still permitting the computer unit to complete its computation cycle at the best sensitivity possible.

Referring again to the operation of delayed detector relay DDR, the delay interval prior to its release is adjustable through the medium of capacitor 236 and adjustable resistor 247. These timing components are so set so that the capacitor 236 will have thereon approximately 100 volts positive of limiting signal acquired while DR is held energized, thus preventing the confusion of a long vehicle with a short vehicle traveling at a very slow speed. The measurement of the last car speed will not be materially in error if the 60 degree angle point at which the last car speed is evaluated is slightly in error as the cosine function varies rather slowly in the 0.866 range.

There is provided at the servo-amplifier assembly (FIG. 7c) a signal limit circuit consisting of variable resistor 330 and diode 331 which limits the voltage applied to the capacitor 263 when the last car speed voltage is stored. This limiting circuit prevents the last car speed reading from exceeding 97 miles per hour for example, thereby preventing coasting of the last car servo system beyond the 100 mile per hour point. If this were not done instability would result in the servo system and the unit would then have to be turned off to correct such condition. Similarly resistor 332, connected between negative voltage source 248 and last car potentiometer arm 267, serves to prevent the last car servo motor 271 from going beyond the zero point on the last car potentiometer 267a. In the absence of this precaution an unstable condition could result requiring resetting of the computer by turning it off and then on again. The insertion of resistor 332 provides a negative voltage to the servo amplifier if the potentiometer exceeds or goes beyond its resistive limit so that the servo motor will be reversed and go back to zero.

FIG. 7a shows in block form the speed averaging computer and the function of the various elements, as detailed in FIGS. 7b, 7c and 7d for developing the last car speed and processing this speed in combination with a prior developed average speed for a desired number of cars to obtain a new average speed. This process is continually taking place for each new vehicle which comes under the influence of the radar beam at the sampling point, so that in effect a running average of the speed of the last predetermined number of cars is continually taking place.

The speed and impulse translator of FIGS. 4a and 4b, as previously described, produces a pulse signal for the presence of cars and a signal indicative of the speed of the car. The presence signal sets up the relay system in FIG. 7d for the commencement of a computer cycle, the speed signal information being fed into the computer for processing via gate 380 which correspond to relay I in FIG. 7d. The gate 380 has been opened by means of detector pulse fed through time delay relay 381 corresponding to the 60° points of the radar beam shown in FIG. 1a; thereby permitting passage of the speed signal through the gate.

The speed signal information in the form of a voltage is set at a level indicative of its true speed by a potentiometer 382 calibrated to give true speed readings. This voltage is stored by a 1st car electrical storage device 383, which corresponds to the capacitor 263 in FIG. 7d, in the form of a D.C. stored charge. The last car voltage of electric storage device 383 is then transferred in effect to the mechanical last car storage device 384 which is equivalent to the potentiometer 267a of FIG. 7b and the servo motor system driving same. The last car speed potential on mechanical device 384, is converted to a last car speed potential squared by $\overline{LC}^2$ device 385 which corresponds to potentiometer 282 in FIG. 7d.

The mechanical storage device 384, prior to the time of reception of the potential on electrical storage device 383, had stored thereon the speed potential of the previous car. The new speed potential reading applied on electrical device 383 was then compared with the potentiometer mechanical device 384 on a null indicator 386 to produce an output signal when matched, to operate the null indicator 386 to operate the gating device 387 of FIG. 7a, corresponding to relay AIN of FIG. 7d.

The last car speed voltage taken from the mechanical storage device 384 is squared by $\overline{LC}^2$ device 385, or potentiometer 282 in FIG. 7d, so that only squared values of the last car readings are used for obtaining the average speed reading of the last number of predetermined cars traversing a given sampling point on the highway. This last car speed squared $\overline{LC}^2$ is fed to a number of cars averaged circuit 388, which in effect combines the previous speed squared average voltage with a desired portion of the last car speed squared voltage on the basis of the number of cars whose combined speed average is to be determined.

The resulting new speed squared average voltage is then stored on the speed squared average voltage $A^2$ electric storage device 389 corresponding to capacitor 293 in FIG. 7d. This new squared average voltage $A^2$ is stored mechanically by mechanical storage device 390 via gate 387, the mechanical storage device corresponding to potentiometer 290 and its servo motor, the servo motor adjusting potentiometer 290 to the new desired average value corresponding to the value stored on electric storage device 389.

The new value of the average squared voltage $A^2$ is compared with the prior $A^2$ voltage in null circuit 391, when these voltages are matched, which resets the system for another cycle of operation. The average speed is in effect taken by comparing the square of the last car speed in the averaging circuit 388 with the square of the average speed $A^2$ fed back from $A^2$ mechanical storage device 390 via feed-back path 392 before the actual computation is made and then adjusting the average to a new squared value.

The R.M.S. average speed $\sqrt{A^2}$ is taken as the square root of the average speed squared $A^2$ this voltage being taken from the potentiometer 290a in FIG. 7b which in turn is connected to potentiometer 290. Block 393 in FIG. 7a corresponds to potentiometer 290a in FIG. 7b.

FIG. 8 shows a block diagram of the necessary equipment, according to the invention, over a plurality of traffic lanes for determining traffic information, the traffic apparatus associated with each of the lanes being the same. With respect to lane one, a radar sensing unit RSI provides from passing vehicles adequate speed and passage sensing signals over suitable transmission facilities to a remote monitoring station where the information is properly processed in accordance with the invention. The speed and passage sensing signals are in turn fed into a speed and impulse translator 416 for the purpose of developing D.C. signals indicative of speed and impulses indicative of vehicle passage.

Both speed and impulse signals are transmitted to a speed averaging computer 417 which provides speed information as to the last car and also the running average of the last predetermined number of vehicles, each new car speed modifying this average.

Impulse signals are also transmitted to a volume computer 418 for the purpose of acquiring information as to the volume of vehicles traversing the highway lane over a predetermined length of time.

Signals are fed from the speed averaging computer 417 and from the volume computer 418 to a graphic recorder 420 for the purpose of continuous permanent recording of the output indications from these computers. The outputs being fed into the graphic recorder are in the form of speed information and volume information.

An analyser 421 is provided to measure the output level of either the speed averaging computer 417 or the volume computer 418 according to the position of switch 422. The analyser 421 is here illustrated connected to the volume computer 418.

The output of the analyser 421 controls the energization of elapsed time meters in the classification recorder 419 which corresponds with 419 of FIG. 6. The elapsed time meter being energized at any given time being dependent upon the settings of the controls of the analyser and the output level of the computer being monitored.

It will be noted that the several reference letters or numbers representing terminals or connecting lines in the several figures are understood to be interconnected where they have the same letter or number in different figures. For example, the lines or terminals JJ, Q, M, J, R, S, T, U, V, W, X, Y in FIG. 7b connect with the corresponding lines or terminals respectively in FIGS. 7c and 7d. That is, M in FIG. 7b connects with M in FIG. 7d, JJ in 7b connects with JJ in FIG. 7d, Q in FIG. 7b connects with Q in FIG. 7d, etc.

Similarly, lines or terminals $e$, $ff$, $g$, $h$, K, L, N, O, and P' for example in FIG. 7c connect with the correspondingly lettered lines or terminals respectively in FIG. 7d. In some instances the same letters are used for two lines or terminals in the same figure to indicate their interconnection instead of showing the actual interconnection line, particularly where the showing of the interconnection by a connecting line might cross several other lines and make the drawing more difficult to read. Some examples of the use of letters or numbers to show connections in this manner are B4 in FIG. 4a, and J in FIG. 7d.

Although the averaging computer has been illustrated and described above in its preferred form for deriving a root mean square value as the average of the desired number of incoming individual values, and thus provides a somewhat higher average value than would be derived by an arithmetic average, particularly as speeds increase, it will be appreciated that the average may be derived as an arithmetic average instead of as an R.M.S. value if desired. For such arithmetic average the squaring potentiometers 282 and 291 will both be omitted or disconnected from terminals R and Q respectively and terminals J and R will be connected together and terminals JJ and Q will be connected together for example.

As shown in FIG. 7b, the switches 335 and 336 are in position to provide an R.M.S. value output on terminal JJ as the output average, and in this position switch 335 connects terminals 337 and 338, and switch 336 connects terminals 339 and 40. However, if an arithmetic average output is desired instead of R.M.S., then switches 35 and 336 can be reversed so that switch 335 connects terminal 337 to terminal 341 instead of to terminal 338 and switch 336 connects terminal 339 to terminal 342 instead of to terminal 340, as one way of disconnecting the squaring potentiometers. The switches 335 and 336 may be mechanically linked or ganged as indicated by line 345 to operate together. With the alternate connection of the switches for arithmetic average as just described, it will be noted that terminals or lines J and R will be interconnected, by switch 335, and terminals or lines JJ and Q will be interconnected by switch 336.

Although an angle of 55° between the center line of the beam and the vertical line BL has been mentioned as an example of a preferred embodiment, and an angle of substantially this order is significant, angles of the order of 50°–55° or slightly greater may be employed for example.

Although six levels have been mentioned and illustrated in the analyser 421 and in the classification recorder 419 as a preferred example, it will be understood that a lesser or greater number of such levels will be provided if desired.

As one example of the range of number of vehicles over which the average speed is to be determined, the potentiometer 289 provided for this purpose may be calibrated over a range of 5 to 30 vehicles, although it will be understood that other ranges may be provided if desired.

It is obvious that numerous changes in construction and rearrangements of the elements might be resorted to without departing from the spirit of the invention as defined by the claims.

What is claimed is:

1. In a vehicular traffic monitoring system the combination comprising a sensing device having a sensing zone in proximity to a traffic lane for developing electrical signals indicative of the presence and speed of each vehicle as it traverses the said sensing zone, a translating device for receiving the said electrical signals, the said device including means for developing speed and impulse signals from the electrical signals, a speed averaging computer for receiving the said impulse signals for the commencement of a computer cycle and the speed signal for processing, the said computer including means for developing signals representative of the last car speed and the last car speed squared and a signal representative of the average of a pre-determined last number of vehicles traversing the traffic lane in the sensing zone, and means for receiving the last car speed squared signal and modifying the average signal.

2. In a vehicular traffic monitoring system the combination comprising a sensing device having a polarized sensing zone in proximity to a traffic lane for developing a selective frequency band of electrical signals indicative of the presence and speed of each vehicle as it traverses the said polarized sensing zone, a translating device for receiving the said selective frequency band of electrical signals, the said device including means for developing speed signals from a first portion of the selective frequency band of electrical signals and impulse signals from a second portion of the selective frequency band of electrical signals, a speed averaging computer for receiving the said impulse signals for the commencement of a computer cycle and the said speed signals for processing, the said computer having means including a storage device for developing a signal representative of the last car speed and the last car speed squared and a signal representative of the average of a pre-determined last number of vehicles traversing the traffic lane in the said polarized sensing zone, and means for receiving the last car speed squared signal and modifying the running average signal.

3. In a vehicular traffic monitoring system the combination comprising a sensing device having a polarized sensing zone in proximity to a traffic lane for developing a selective frequency band of electrical signals indicative of the presence and speed of each vehicle as it traverses the said polarized sensing zone, a translating device for receiving the said selective frequency band of electrical signals, the said device including means for developing speed signals from a first portion of the selective frequency band of electrical signals and impulse signals from a second portion of the selective frequency band of electrical signals, a speed averaging computer for receiving the said impulse signals for the commencement of a computer cycle and the speed signals for processing, the said computer having means including an electric storage device and a mechanical storage device for developing signals representative of the last car speed and the last car speed squared and a signal representative of the average of a pre-determined last number of vehicles traversing the traffic lane in the said polarized sensing zone, and means for receiving the last car speed squared signal and for modifying the average signal.

4. In a vehicular traffic monitoring system the combination comprising a radar sensing device for transmitting and receiving microwave signals in a zone of operation in proximity to a traffic lane, the said received microwave signal being converted to electrical signals indicative of the presence and speed of each vehicle traversing the said zone of operation, a speed and impulse translator device for receiving the said electrical signals, the said device including means for developing a D.C. signal indicative of the vehicle speed and an impulse signal indicative of the presence of the vehicle, a speed averaging computer for receiving the said impulse for the commencement of a computer cycle and the speed signal for processing, the said computer including means for developing a signal representative of the last car speed and the last car speed squared and a signal representative of the average of a pre-determined last number of vehicles traversing the traffic lane in the said zone of operation, and means for receiving the last car speed squared signal and for modifying the average signal.

5. In a vehicular traffic monitoring system the combination comprising a radar sensing device for transmitting and receiving microwave signals in a zone of operation in proximity to a traffic lane, the said received microwave signal being converted to a selective frequency band of electrical signals indicative of the presence and speed of each vehicle traversing the said zone of operation, a speed and impulse translator device for receiving the said selective frequency band of electrical signals, the said device including means for developing a D.C. signal indicative of the vehicle speed from a portion of the selective frequency band of electrical signals and an impulse signal indicative of the presence of the vehicle from another portion of the selective frequency band of electrical signals, a speed averaging computer having relay means for receiving the said impulse to initiate the commencement of a computer cycle and the speed signal for processing, the said computer including means for developing a signal representative of the last car speed and the last car speed squared and a signal representative of the average of a pre-determined last number of vehicles traversing the traffic lane in the said zone of operation, and means for receiving the last car speed squared signal and modifying the average signal.

6. In a vehicular traffic monitoring system the combination comprising a radar sensing device including a directive antenna for transmitting and receiving microwave signals in a zone of operation, determined by the said antenna, in proximity to a traffic lane, the said device including means for converting the said microwave signals to electrical signals indicative of the presence and speed of each vehicle traversing the said zone of operation, a speed and impulse translator device for receiving the said electrical signals, the said device including means for developing a D.C. signal indicative of the vehicle speed and an impulse signal indicative of the presence of the vehicle, a speed averaging computer for receiving the said impulse for the commencement of a computer cycle and the speed signal for processing, the said computer including means for developing a signal representative of the last car speed and the last car speed squared and a signal representative of the average of a predetermined last number of vehicles traversing the traffic lane in the zone of operation and means for receiving the last car speed squared signal and for modifying the average signal, and a volume computer for receiving the said impulse signals including means for processing the said signals to evolve a signal indicative of the total number of vehicles traversing the said lane in the zone of operation over a pre-determined period of time.

7. In a vehicular traffic monitoring system the combination comprising a radar sensing device including a directive antenna for transmitting and receiving microwave signals in a zone of operation, determined by the said antenna, in proximity to a traffic lane, the said device including means for converting the said microwave signals to a selective frequency band of electrical signals indicative of the presence and speed of each vehicle traversing the said zone of operation, a speed and impulse translator device for receiving the said electrical signals, the said device including means responsive to the presence of the electrical signals for developing a D.C. signal indicative of the vehicle speed and an impulse signal indicative of the presence of the vehicle, a speed averaging computer for receiving the said impulse for the commencement of a computer cycle and the speed signal for processing, the said computer having means including an electric storage device and a mechanical storage device for developing a signal representative of the last car speed and the last car speed squared and a signal representative of the average of a predetermined last number of vehicles traversing the traffic lane in the zone of operation and means for receiving the last car speed squared signal and for modifying the average signal, and a volume computer for receiving the said impulse signals including means for processing the said signals to evolve a signal indicative of the total number of vehicles traversing the said lane in the zone of operation over a pre-determined period of time.

8. In a vehicular traffic monitoring system the combination comprising a radar sensing device including a directive antenna for transmitting and receiving microwave signals in a zone of operation, determined by the said antenna, in proximity to a traffic lane, the said device including means for converting the said microwave signals to electrical signals indicative of the presence and speed of each vehicle traversing the said zone of operation, a speed and impulse translator device for receiving the said electrical signals, the said device including means for developing a D.C. signal indicative of the vehicular speed and an impulse signal indicative of the presence of the vehicle, a cyclically operable speed averaging computer disposed to receive the said impulse for the commencement of a computer cycle and the speed signal for processing, the said computer including means for developing a signal representative of the last car speed and the last car speed squared and a signal representative of the average of a pre-determined last number of vehicles traversing the traffic lane in the zone of operation and means for receiving the last car speed squared signal and for modifying the running average signal, a volume computer for receiving the said impulse signals including means for processing the said signals to evolve a signal indicative of the total number of vehicles traversing the said lane in the zone of operation over a predetermined period of time and volume range means for receiving the said volume signals over a pre-selected number of volume ranges and recording the time duration of the volume of vehicles in each of the pre-selected ranges.

9. In a vehicular traffic monitoring system the combination comprising a radar sensing device including a directive antenna for transmitting and receiving microwave signals in a zone of operation, determined by the said antenna, in proximity to a traffic lane, the said device including means for converting the said microwave signals to electrical signals indicative of the presence and speed of each vehicle traversing the said zone of operation, a speed and impulse translator device for receiving the said electrical signals, the said device including means for developing a D.C. signal indicative of the presence of the vehicle, a speed averaging computer for receiving the said impulse for the commencement of a computer cycle and the speed signal for processing, the said computer including means for developing a signal representative of the last car speed and the last car speed squared and a signal representative of the average of a pre-determined last number of vehicles traversing the traffic lane in the zone of operation and means for receiving the last car speed squared signal and for modifying the average signal, a volume computer for receiving the said impulse signals including means for processing the said signals to evolve a signal indicative of the total number of vehicles traversing the said lane in the zone of operation over a predetermined period of time, volume range means for receiving the said volume signals over a pre-selected number of volume ranges and recording the time duration of the volume of vehicles in each of the pre-selected ranges, and visual speed recording means for receiving the last car speed and average speeds and visual volume recording means for receiving the volume indicative signals.

10. In a system for monitoring vehicular traffic at a given location along a highway lane including radar sensing means thereat for developing electrical signals indicative of speed and presence of vehicles traversing the highway lane location, a speed and impulse translator for receiving the said electrical signals comprising first amplifier means for selectively amplifying the said electrical signals in a first predetermined frequency range indicative of the vehicle speed, means responsive to the amplified range of electrical signal for producing a direct current signal indicative of the vehicular speed, second amplifier means for amplifying the said electrical signals in a second predetermined frequency range indicative of the presence of vehicles, means responsive to the said amplified second frequency range for developing an impulse signal indicative of the passage of each vehicle traversing the said highway location.

11. In a system for monitoring vehicular traffic at a given location along a highway lane including radar sensing means thereat for developing a selective frequency band of electrical signals indicative of speed and presence of vehicles traversing the highway lane location, a speed and impulse translator for receiving the said selective frequency band of electrical signals comprising first amplifier means responsive to the electrical signals for selectively amplifying the said electrical signals in a first predetermined frequency range indicative of the vehicle speed, means responsive to the amplified range of electrical signal for producing a direct current signal indicative of the vehicular speed, second amplifier means for amplifying the said selective frequency band of electrical signals in a second predetermined frequency range indicative of the presence of vehicles, means responsive to the said amplified second frequency range for developing an impulse signal indicative of the passage of each vehicle traversing the said highway location.

12. In a system for monitoring vehicular traffic at a given location along a highway lane including radar sensing means thereat for developing a selective frequency band of electrical signals indicative of speed and presence of vehicles traversing the highway lane location, a speed and impulse translator for receiving the said selective frequency band of electrical signals comprising a first amplifier including gain control means responsive to the presence of the electrical signals for selectively amplifying the said selective frequency band of electrical signals in a first predetermined frequency range indicative of the vehicle speed, means responsive to the amplified range of electrical signal for producing a direct current signal indicative of the vehicular speed, a second amplifier for amplifying the said electrical signals in a second predetermined frequency range indicative of the presence of vehicles, means responsive to the said amplified second frequency range for developing an impulse signal indicative of the passage of each vehicle traversing the said highway location.

13. In a system for monitoring vehicular traffic at a given location along a highway lane including radar sensing means thereat for developing electrical signals indicative of speed and presence of vehicles and translator means for receiving the said electrical signals to develop D.C. signals indicative of vehicle speed and impulse signals indicative of vehicle presence, a cyclically operable speed averaging computer comprising means disposed to receive the said impulse signal to permit the transmission of the said D.C. speed signal to initiate the commencement of a computer cycle, first electrical storage means for receiving the speed signal, means including a potentiometer for storing the last car speed signal, means responsive to the difference of the said speed and last car speed signals to drive the potentiometer to the same signal level as the electrical storage speed signal, a first null indicator circuit for receiving the speed and last car speed signal for producing a first null signal when the speed signal and last car speed signal are equal, means for squaring the last car speed signal, means for receiving the last car speed squared signal to produce a modified average speed squared signal for a predetermined last number of vehicles traversing the said zone of operation, second electrical storage means for receiving and storing the said modified average speed squared signal, means including a potentiometer responsive to the said first null signal for storing the modified average speed squared signal, a second null indicator circuit for receiving the modified average speed signal squared and a prior stored average speed squared signal and producing a second null signal when the said modified and prior stored signals are equal, means for producing an average speed signal from the said stored modified average signal squared, and means responsive to the said second null signal for resetting the computer for the commencement of a new computer cycle.

14. In a system according to claim 13 wherein the said means responsive to the difference of the said speed and last car speed signals includes amplifier means for receiving the said signals to produce an A.C. signal having a phase relation indicative of the amplitude difference of the said speed signals and servo motor means for receiving the said A.C. signal for driving the potentiometer to a position having a signal level equal to the speed signal.

15. A speed averaging system including means for measuring the speed of individual vehicles successively passing a traffic sampling location and producing successive individual electrical values representative of such individual speeds and means for producing a second electrical value representative of an average of the latest predetermined number of said individual electrical values, said last named means including means for producing and storing a prior second electrical value representative of the average of the latest predetermined number of said successive electrical values immediately prior to the latest said individual value, means for comparing said latest individual electrical value with said prior second electrical value to produce a new second electrical value as an average of said latest individual value and said prior second electrical value, and means for storing said new electrical value in place of said prior second electrical value.

16. A traffic speed averaging system as in claim 15 and in which said comparing and averaging means includes means for applying to the prior said second electrical value a fractional part of the difference between the latter and the latest individual electrical value adjustable in accordance with the number of vehicles for which the average is desired.

17. A traffic speed averaging system as in claim 15 and in which said means for producing and storing electrical values includes means for deriving a squared value from the last individual electrical value corresponding to the speed of the last vehicle and obtaining an average square electrical value therefrom as said new second electrical value, and means for deriving and the square root of said average square value.

18. A traffic speed averaging system as in claim 17 and including means for indicating the latest derived square root value in terms of speed.

19. A traffic speed averaging system as in claim 15 and including means for indicating said stored new second electrical value in terms of speed.

20. A traffic speed averaging system as in claim 15, and including means for indicating the latest stored individual electrical value in terms of speed as the speed of the last vehicle and means for indicating the latest stored average electrical value in terms of speed as the average speed of the last desired number of vehicles.

21. In a system for obtaining an average of the last desired number of a continuing series of random individual values, means for storing an electrical value representative of said average, means for receiving each individual value in succession and storing an individual electrical value representative of the latest of such individual values, means for deriving a new electrical value representative of said average by adding algebraically to the previous said stored electrical value representing the previous such average a fraction of the difference between the new said latest individual value and said previous stored electrical value.

22. A system for approximating an average of the last predetermined number of a continuing series of individual random values, including means for receiving said individual values in succession and for developing and storing an individual electrical value representative of the latest of said individual value, an electro-mechanical storage means for receiving and storing said approximated average as developed by successive individual electrical values, a temporary electrical storage element, and a divider circuit connected between the said electro-mechanical storage means and said latest stored individual electrical value, and having a tap at a desired fraction of the total electrical value across said divider circuit and connected to said temporary electrical storage element to apply said desired fraction of the difference in electrical values thereto in algebraic addition to the latest prior said average electrical value as stored to provide a modified view average approximating values on said temporary electrical storage element, and means for transferring said new average approximating value from said temporary electrical storage element to said electro-mechanical average storage means resetting said temporary electrical storage element.

23. A system as in claim 22 and including means for adjusting said divider circuit to adjust the fraction of the difference in values applied to said temporary storage element for varying the number over which the average is to be taken.

24. A system as in claim 22 and including means for indicating visually the electrical value stored in said electro-mechanical storage means.

25. A system as in claim 22 and including means for indicating visually the electrical value stored in said electro-mechanical storage means as the average value, and means for indicating visually the individual electrical value stored as the latest individual value.

26. A system for deriving an average of the last desired number of values in a continuing series of random individual values, including means for receiving each of the individual values in succession and storing an individual electrical value corresponding to the last of said values and discarding the previously stored such electrical value corresponding to the next to last such individual value, a first electro-mechanical storage unit, means for operating said electro-mechanical storage unit to store a further individual electrical value corresponding to said first mentioned stored individual last value, a second electro-mechanical storage unit, means for operating the latter unit to store an electrical value representing the last previous average value for the latest received several values prior to the present last individual values to be averaged, a temporary electrical storage element, and means including an electrical dividing circuit for placing in said temporary electrical storage element a resultant electrical value comprising the algebraic sum of the previously stored average value in said second electro-mechanical storage element and a fraction of the difference between the last named value and the last stored individual electrical value as stored in said first electro-mechanical storage element, said fraction adjustable according to the desired number of values for which the average is to be derived, said electrical dividing circuit including impedance means interconnecting said first and second electro-mechanical storage elements and having a tap on such dividing circuit connected to said temporary electrical storage element, and means for disconnecting said temporary electrical storage element from said divider circuit means and connecting it to control said operating means of said second electro-mechanical storage element to store an electrical value corresponding to the said resultant new electrical value in said temporary storage element, and means disconnecting said temporary electrical storage element from said second electro-mechanical storage element and resetting said temporary electrical storage element to discard said new resultant electrical value therefrom, whereby said second electro-mechanical storage element will have stored the latest average of the desired number of said series of values approximately.

27. A system as in claim 26, and including dual potentiometers in each of said first and second electro-mechanical storage elements, the rotor contact arm of one of the dual potentiometers being connected in series with the stator of the other of the dual potentiometers and the contact arms of the dual potentiometers being driven together to provide a square relationship between the electrical values on the respective contact arms, and means connecting said individual electrical value as input to one arm and deriving the square of such last named value from the second arm of the first electro-mechanical storage element for storing the last individual value and the square of such value, said interconnecting means connecting the said last named second arm via said impedance means to a corresponding second arm on the squared value potentiometer of the second electro-mechanical storage element, and an output circuit from the first arm of said second electro-mechanical storage element to provide an output value representing the square root of the average squared value.

28. A method of obtaining an average of the latest desired predetermined number of values in a continuing series of random values comprising receiving such values in succession and storing electrically the latest individual value and the previously accumulated average of such values, applying a fraction of the difference between said previous average value and last individual value as an algebraic addition to the said previous average value such as to obtain a new resulting electrically stored value representing the new average value approximately after said desired number of values.

29. A method of obtaining and indicating an approximate average of the latest desired number of values of a continuing series of random individual values, comprising receiving such values in succession and storing electrically the latest individual value and the previously accumulated average of such values, applying a fraction of the difference between said previous average value and last individual value as an algebraic addition to the said previous average value such as to obtain a new resulting electrically stored value representing the new average value approximately after said desired number of values, and deriving therefrom an indication of said new resulting electrical stored value representative of the new average value.

30. A method of obtaining an approximate average of the last desired number of values in a continuing series of random values, including receiving and storing an electrical value representative of the latest one of said series of individual values, storing an electrical value representing the previous average of such individual values prior to receipt of the last said individual value, deriving and storing a new electrical value which is the resultant of the algebraic addition to the previously stored average value of a fraction of the difference between the latter and the last stored individual value, such fraction being proportional to the number of values over which the average is desired to obtain as said resultant value an exponential value approaching the desired new average value, and adjusting the previously stored average value to the new resultant exponential value.

31. A method of obtaining an approximate average of the latest desired part of a continuing series of random values, including receiving the random values in succession, converting the random value into an individual electrical storage value, deriving a corresponding electro-mechanically stored individual electrical value, adding algebraically to the previously stored average electrical value a fraction of the difference between the latter and the electro-mechanically stored individual electrical value to obtain a new resulting stored electrical value representing the new average value, such fraction being of the order of three over the number of such values to be included in such average, and deriving a new electro-mechanically stored average electrical value corresponding to the new said resulting stored electrical value.

32. A traffic speed measuring system including means for detecting the passage of a vehicle at a desired location on a traffic path and providing an output pulse of time length in approximate inverse relation to the speed of such passage, means for measuring the speed of the vehicle directly when rendered effective, and means for rendering said speed measuring means so effective at a desired distance along said path from said detecting means in accordance with the time length of said output pulse.

33. A traffic speed measuring system including means for directing a beam of radiant energy at an angle along a vehicular traffic path and for receiving such energy reflected back from a vehicle passing along said path and mixing said reflected energy with the first mentioned energy, means for deriving from said mixing an electrical wave energy having a frequency proportional to the speed of the vehicle as modified by the cosine of the angle between the path of the vehicle and the path of the said radiant energy incident to and reflected from the vehicle, such frequency varying progressively from a very low value as the vehicle passes near said first named means to a relatively high value as the vehicle departs from said first named means at a substantial distance therefrom as the vehicle continues its passage along the road where the cosine of said angle approaches unity, means for selecting from said derived wave energy a very low frequency band characteristic of close passage of the vehicle and for deriving an output pulse of length having a generally inverse relation to the speed of the vehicle, means for selecting from said derived wave energy a high frequency band substantially above said low frequency band to provide an output electrical signal having a progressively increasing frequency approaching the true speed of said vehicle as said vehicle departs, means for translating said selected high frequency to indicate the speed of said vehicle at a desired low such angle as timed by said output pulse and including correction for the cosine of said desired angle to provide a substantially true indicated speed.

34. A traffic speed measuring system as in claim 33 and in which said beam directing means is over a traffic lane and directs said beam of radiant energy downward at an angle of the order of 50 to 55 degrees from the vertical and in the general direction of departing traffic in said traffic lane, and in which said desired low angle is of the order of 30 degrees.

35. A traffic speed measuring system as in claim 33 and in which said beam directing means is over and individual to a single traffic lane and so directs said beam downward at an angle of the order of 50 to 55 degrees from the vertical and in the general direction of departing traffic in said lane, and in which said beam has a narrow angle transverse to said lane to substantially cover said single lane and said beam has a wide vertical angle providing a substantial amount of said radiant energy substantially vertically downward under said beam directing means to be so reflected from a vehicle passing closely under said beam directing means.

36. A traffic speed measuring system as in claim 33 and in which said selecting means and said translating means are remote from said speed proportional electrical wave energy deriving means.

37. A traffic speed measuring system as in claim 33 and in which the last named translating means includes a capacitor and means for varying the charge on said capacitor progressively in one sense over the period of said output pulse and means for varying the charge on said capacitor progressively in the opposite sense after the end of said output pulse to so time a delay period to so indicate the speed where the vehicle has reached a point corresponding to said low angle.

38. A method of obtaining an average speed of a predetermined number of vehicles which have immediately passed a location on a roadway comprising directing a series of high frequency electrical waves toward the location and sensing waves reflected from that location, developing an electrical signal proportional to the frequency of the reflected waves sensed, developing a second electrical signal from the reflected waves sensed indicative of the presence of a vehicle at said location, storing said first signal, storing an electrical value representing the previous average of electrical signals proportional to speed of a predetermined number of vehicles previously passing said location, utilizing the second signal to indicate that a new average should be computed including said first signal, and algebraically adding said first signal to a portion of said stored electrical value and storing the electrical value resulting from the the algebraic addition.

39. In a system for monitoring vehicular traffic at a given location along a highway lane with a radar sensing device at said location for developing electrical signals indicative of the presence and speed of moving vehicles traversing the highway lane at the said location, the combination comprising a directional antenna for transmitting microwave signals along the lane and for receiving a band of reflected Doppler signals which are time spaced in dependence upon the position and speed of the vehicle, means responsive to the lower frequency signals of said band to indicate the presence of the vehicle and means responsive to the higher frequency signals of said band for indicating the speed of the vehicle.

40. Traffic control apparatus comprising a directional radar antenna for radiating microwave energy along a traffic lane and at a substantial angle thereto and for receiving reflected Doppler signals having components representing the presence and speed of moving vehicles in said lane, frequency sensitive means for discriminating between the presence and speed signals of the vehicle so that a single antenna will produce speed and presence signals which correspond to the same vehicle.

41. Traffic control apparatus comprising a directional radar antenna for radiating microwave energy, along a roadway and at a substantial angle thereto for receiving reflected Doppler signals having individual frequency components representing the presence and speed of moving vehicles in said lane, a speed computer, a volume computer, first frequency selective bandpass means for passing the reflected speed component to the speed computer, and second frequency selective bandpass means for passing the reflected presence component to the volume computer so that volume and speed information of vehicles moving along a lane may be determined with a single directional antenna.

42. Apparatus for obtaining an average of the latest desired predetermined number of values in a continuing series of random values comprising means for receiving such values in succession and storing electrically the latest individual value and the previously accumulated average of such values, means for applying a fraction of the difference between said previous average value and last individual value as an algebraic addition to the said previous average value such as to obtain a new resulting electrically stored value representing the new average value approximately after said desired number of values.

43. Apparatus for obtaining and indicating an approximate average of the latest desired number of values of a continuing series of random individual values, comprising means for receiving such values in succession and storing electrically the latest individual value and the previously accumulated average of such values, means for applying a fraction of the difference between said previous average value and last individual value as an algebraic addition to the said previous average value such as to obtain a new resulting electrically stored value representing the new average value approximately after said desired number of values, and means for deriving therefrom an indication of said new resulting electrical stored value representative of the new average value.

44. Apparatus for obtaining an approximate average of the last desired number of values in a continuing series of random values, including means for receiving and storing an electrical value representative of the latest one of said series of individual values, means for storing an electrical value representing the previous average of such individual values prior to receipt of the last said individual value, means for deriving and storing a new electrical value which is the resultant of the algebraic addition to the previously stored average value of a fraction of the difference between the latter and the last stored individual value, such fraction being proportional to the number of values over which the average is desired to obtain as said resultant value an exponential value approaching the desired new average value, and means for adjusting the previously stored average value to the new resultant exponential value.

45. Apparatus for obtaining an approximate average of the latest desired part of a continuing series of random values, including means for receiving the random values in succession and for converting the random value into an individual electrical storage value, means for deriving a corresponding electro-mechanically stored individual electrical value, means for adding algebraically to the previously stored average electrical value to obtain a new resulting stored electrical value representing the new average value, such fraction being of the order of three over the number of such values to be included in such average, and means for deriving a new electro-mechanically stored average electrical value corresponding to the new said resulting stored electrical value.

46. Apparatus for obtaining an average speed of a predetermined number of vehicles which have immediately passed a location on a roadway comprising means for directing a series of high frequency electrical waves toward the location and sensing waves reflected from that location, means for developing an electrical signal proportional to the frequency of the reflected waves sensed, means for developing a second electrical signal from the reflected waves sensed indicative of the presence of a vehicle at said location, means for storing said first signal, means for storing an electrical value representing the previous average of electrical signals proportional to speed of a predetermined number of vehicles previously passing said location, means utilizing the second signal to indicate that a new average should be computed including said first signal, and means algebraically adding said first signal to a portion of said stored electrical value and storing the electrical value resulting from the algebraic addition.

References Cited in the file of this patent

UNITED STATES PATENTS

| | | |
|---|---|---|
| 2,620,470 | Rather | Dec. 2, 1952 |
| 2,785,395 | Platzman | Mar. 12, 1957 |